United States Patent
Böttcher et al.

(10) Patent No.: US 6,949,292 B2
(45) Date of Patent: Sep. 27, 2005

(54) METHOD FOR PRODUCING DEFINED LAYERS OR LAYER SYSTEMS

(76) Inventors: Henrik Böttcher, Am Kleinen Felde 20, 30167 Hannover (DE); Hellmuth Wurm, Alte Strasse 77, 79249 Merzhausen (DE); Manfred L. Hallensleben, Kirchweg 9, 79299 Wittnau (DE)

( * ) Notice: Subject to any disclaimer, the term of this patent is extended or adjusted under 35 U.S.C. 154(b) by 62 days.

(21) Appl. No.: 10/721,369

(22) Filed: Nov. 25, 2003

(65) Prior Publication Data

US 2004/0142171 A1 Jul. 22, 2004

Related U.S. Application Data

(62) Division of application No. 09/763,588, filed on Feb. 22, 2001, now Pat. No. 6,653,415.

(30) Foreign Application Priority Data

Aug. 22, 1998 (DE) .......................................... 198 38 241

(51) Int. Cl.[7] ............................................... B32B 9/04
(52) U.S. Cl. .................................... 428/411.1; 428/420
(58) Field of Search ............................. 428/411.1, 420

(56) References Cited

U.S. PATENT DOCUMENTS

| | | | | |
|---|---|---|---|---|
| 5,574,079 A | * | 11/1996 | Eaton et al. | 523/423 |
| 5,807,937 A | * | 9/1998 | Matyjaszewski et al. | 526/135 |
| 6,071,980 A | * | 6/2000 | Guan et al. | 522/66 |

* cited by examiner

*Primary Examiner*—Ramsey Zacharia
(74) *Attorney, Agent, or Firm*—Pendorf & Cutliff

(57) ABSTRACT

The invention relates to a method for producing defined layers or layer systems made of polymers or oligomers on any solid surface and with a controlled structure, according to which the layers are chemically deposited on the solid surface by means of living/controlled free-radical polymerization. Said method comprises the following steps: a) bonding the compounds of the general formula (a) A-L-I to the solid surface via the active group A, where A represents an active group, I is the initiating group for ATRP polymerization and L is the binding link between A and I; and b) carrying out living/controlled free-radical polymerization by reacting the initiator group I with monomers, macromonomers or mixtures able to undergo free-radical polymerization, which produces the polymer layer on the solid surface. The invention also relates to solid surfaces with oligomer or polymer layers and initiators for carrying out the method.

2 Claims, 34 Drawing Sheets

METHOD FOR PRODUCING DEFINED LAYERS OR LAYER SYSTEMS

CROSS REFERENCE TO RELATED APPLICATION

This application is a Divisional of U.S. application Ser. No. 09/763,588 filed Feb. 22, 2001, which issued U.S. Pat. No. 6,653,415 on Nov. 25, 2003, and which is a 371 of PCT/EP99/06009 filed on Aug. 17, 1999.

BACKGROUND OF THE INVENTION

1. Field of the Invention

The subject of the invention is a process for producing defined layers or layer systems of polymers or oligomers with controlled structure on arbitrary solid surfaces, wherein the layer is chemically bonded to the solid surface and applied by means of "living"/controlled free radical reaction. Solid surfaces with oligomer or polymer layers, as well as various compounds containing an anchor group as well as a group from which the polymer growth proceeds in accordance with the ATRP mechanism are a further subject of the invention. Such compounds are termed initiators below.

The present invention relates to a process based on the mechanism of "living"/controlled free radical reaction and polymerisation for chemical modification of arbitrary solid surfaces. In this context the solid can consist of an arbitrary material, can be of a solid or porous nature, can be in finely divided form, can be of natural or synthetic origin, or exhibit a heterogeneous surface structure or surface composition. The physico-mechanical properties of the solid used, such as hardness, ductility, deformability or surface roughness, are also unimportant for the process.

Here the term "surface" relates not only to surfaces in the conventional sense, where, in general, a surface is understood to be the boundary between a solid and a gas or a liquid. The term surface also includes the internal surface of a porous material. Going beyond this, when applied to the surface-modified materials the term surface relates quite generally to arbitrary phase boundaries. Thus, a surface can, for example, also be, the internal surface between two different components within a composite material. Examples of this type are composite materials consisting of a polymer matrix and an inorganic reinforcing agent, polymers filled with dyes or a polymer-metal composite; thus, quite generally, composite materials consisting of a polymer matrix and a functional additive.

Surface properties can be tailored by chemical modification of solid surfaces. On the one hand, a desired quality can be imparted to the surface in this way; on the other hand, the quality of the physical interaction of the surface-modified solid with other substances, the chemical reactivity and the capacity for chemical binding of other substances can be adjusted in a targeted manner.

If layers or layer systems are applied to surfaces, it is possible, in the individual case, so to modify the properties of the original surface that the characteristics of the system as a whole are then determined solely by the coating. Thus, it is possible, for example, to impart the requisite mechanical strength to a composite system by means of a suitable carrier material and, on the other hand, by means of the coating system, to adjust the mechanical, physical and/or chemical properties of the surface to those desired.

2. Description of the Related Art

Various techniques are customary In order to modify solid surfaces by application of polymers. For example, processes in which dissolved polymers are sprayed on, or applied by spin coating, dip coating or in accordance with the Langmuir-Blodgett technique (LB films) are described in the literature. With these processes binding of the polymers at the surface is to a very large extent of an adhesive nature. The process parameters are frequently difficult to control with these processes; moreover, the Langmuir-Blodgett technique in particular can be applied only on planar surfaces and is essentially restricted to amphiphilic molecules or molecules having a rigid chain.

Polymer molecules can also be chemically bonded to solid surfaces by forming a covalent chemical bond at the solid surface via, usually, terminal groups of the polymer molecules ("grafting to", for example via a condensation reaction). A disadvantage of this process is that the yields of such surface reactions, and thus the graft densities of the polymer molecules on the surface, are generally not very high since polymer molecules that have already been bound impede the approach of further molecules to the surface. Furthermore, the process is restricted to polymers of relatively low molar mass, since it is only with small molecules that there is a sufficiently high probability that the functional group of the polymer molecule is withinin reach of the bonding points on the solid surface and a chemical reaction between the two thus becomes possible.

In order to circumvent the disadvantages associated with "grafting to" processes, in further developed processes the polyreactions for formation of polymers are initiated directly at the solid surface ("grafting from") [J. Rühe, "Massgeschneiderte Oberflächen" ("Tailored surfaces"), Nachr. Chem. Tech. Lab 42 (1994) 1237]. In this context in the prior art on polymerisation reactions using solid surfaces as starting materials the conventional free radical graft reactions are usually described: conventional initiators, i.e. azo compounds, peroxides and the like, are used to initiate the free radical polymerisation reactions. If such initiators are covalently bonded to solid surfaces in order to initiate graft reactions from here, this is thus associated with the following disadvantage: in the case of symmetrical initiators such as, for example, azo-bis-isobutyronitrile (AiBN) or benzoyl peroxide (BPO), after decomposition one fragment is covalently bonded to the solid surface as initiating radical; the second radical fragment, on the other hand, remains unbound and in turn is able to initiate a polymerisation reaction, which, however, takes place not at the solid surface, but unbound. Therefore, in the case of a polymerisation initiation with the abovementioned conventional initiators non-bound polymer is always also formed in addition to non-bound (sic) polymer.

This situation has lead to the search for an alternative via asymmetric initiators, only the bound radical fragment of which has a reaction-initiating action following decomposition. This is, for example, described in detail in the papers by Rühe et al. [O. Prucker, J. Rühe, Macromolecules 31, 592 (1998); O. Prucker, J. Rühe, Macromolecules 31, 602 (1998)].

In addition, in the case of all free radical polymerisation reactions conventionally initiated hitherto these are subject to the conventional kinetics of free radical polymerisation, i.e. the graft branch length and the termination reactions can be only inadequately controlled and the chain length is subject to the typical chain length distributions of conventional free radical polymerizations [see Brurio Vollmert, Grundriss der Makromolekularen Chemie (Principles of Macromolecular Chemistry), Vol. I, E. Vollmert-Veriag, Karlsruhe, 1979]. Furthermore, the chain ends of the graft branches are no longer reactive after the polymerisation reaction, so that, for example, grafting of a second polymer generation is not possible.

This disadvantage of free radical polymerisation has recently been largely eliminated by a new process. If a free radical polymerisation reaction is carried out in accordance with a "living"/controlled free radical mechanism it is possible to produce defined polymers, the chain length and polydispersity of which can be substantially better controlled than is the case in conventional free radical polymerisation. Since the number of chain terminations in this process is greatly reduced, the term "stable free radical polymerisation" (SFRP) is also employed. This process was further refined by K. Matyjaszewski et al., by the introduction of the "atom transfer radical polymerisation" (ATRP) concept [K. Matyjaszewski, S. Coca, S. Gaynor, Y. Nakagawa, S. M. Jo, "Preparation of Novel Homo- and Copolymers using Atom Transfer Radical Polymerisation", WO 98/01480]. To date "living"/controlled free radical polymerisations, including in their refinement according to the ATRP-mechanism, have been carried out only in the liquid phase, with or without additional solvent.

In ACS Polym. Preprints [Div. Polym. Chem. (39), 626 (1998)] Craig J. Hawker, et al. describe the synthesis and application of polymers using "living"/free radical polymerisation reactions. The initiators used for the free radical polymerisation are compounds which contain nitroxide groups. These compounds also have terminal trichlorosilyl groups, which can be bound to surfaces of silica gel and silicon wafers by chemical reactions.

In Macromoulecules 1998, 31, 5934 Tsujii, et al. describe controlled graft polymerisations of methyl methacrylate on silicon oxide-containing substrates by combined use of the Langmuir-Blodgett (LB) technique and the ATRP (Atom Transfer Radical Polymerisation) technique 2-(4-chlorosulphonylphenyl)ethyltrimethoxysilane is used as initiator compound. This compound possesses a chlorosulphonyl group as initiator group for the "living"/controlled polymerisation. After applying the monolayer of the abovementioned initiator, which has been compressed at a water/air interface, to a silicon wafer by means of the LB technique, the "living"/controlled free radical polymerisation of methyl methacrylate is carried out from the silicon wafer surface modified in this way.

These processes of the state of the art have the following disadvantages: in the case of the "stable free radical polymerisation" SFRP using nitroxides a thermal polymerisation that proceeds simultaneously and does not proceed from the surface frequently takes place because of the requisite high temperatures of 120 to 130° C. Thus, there are considerable disadvantages associated with the process for the "living"/controlled free radical grafting of solid surfaces, specifically a) non-bound polymer formed consumes monomer,
b) growing bound and non-bound polymer chains compete for nitroxides and thus influence control of the growing chains,
c) non-bound polymer is present as reaction product alongside polymer-modified solid surfaces.

According to the publication by Tsuji et al. 2-(4-chlorosulphonylphenyl)-ethyltrimethoxysilane is employed as initiator compound. Chlorosulphonylphenyl groups are known to be highly reactive and in particular susceptible to hydrolysis, so that they are difficult to work with. Compounds which contain such groups, and also surfaces provided with these, are unstable.

Furthermore, the LB method described in this publication can be applied only to planar substrate surfaces, and here of limited size, but not to solid surfaces of any size, shape and composition, and also not to internal surfaces of materials having open porosity. The density of the molecules in the layer can be influenced to only an incomplete extent. Estimation of the degree of polymerisation of the grafted polymer molecules is carried out only indirectly; the grafted polymer molecules themselves are not used for this purpose. Furthermore, it is not stated that the chain ends are capable of further initiation.

SUMMARY OF THE INVENTION

The technical problem to be solved consists in making available a process for the production of layers or layer systems of polymers or oligomers in which initiators are employed which do not have the abovementioned disadvantages and enable coating of systems of arbitrary, size, surface structure or composition. Furthermore, it should be possible to suppress the occurrence of a thermal polymerisation by employing lower reaction temperatures and a suitable reaction procedure.

This technical problem is solved by a process for producing defined layers or layer systems of polymers or oligomers with controlled structure on arbitrary solid surfaces, wherein the layers are chemically bonded to the solid surface and are applied by means of "living"/controlled free radical reaction, by the following steps:

a) binding initiators of the general formula 1 to the solid surface

   1

In this formula A is an anchor group, I the group acting as initiator for the ATRP polymerisation and L the connecting link between A and I.

b) carrying out a "living"/controlled free radical polymerisation in accordance with the ATRP mechanism using the initiator of the general formula 1 bound to a solid surface and monomers or macromonomers capable of free radical polymerisation as the starting materials, by which means the polymer layer is applied to the solid surface.

Further characteristics of the process according to the invention can be taken from claim 1.

The invention relates to a process for use of the "living"/controlled free radical polymerisation for targetted and defined chemical modification of arbitrary solid surfaces. In this process oligomer or polymer molecules are formed directly on the solid surface in a "living"/controlled free radical polymerisation reaction. According to the state of the art, prior to the development of the present invention free radical polymerisation reactions initiated from solid surfaces were difficult to control or impossible to control as far as the chain length of the growing polymer chains was concerned. According to the invention, free radical reactions that start from appropriately chemically equipped solid surfaces can now be carried out without termination, that is to say can be controlled in a targeted manner. Thus, it is possible to tailor the graft branch length, with a narrow graft branch length distribution at the same time; similarly block copolymers are readily accessible as graftings The advantage of the process according to the invention lies in the use of the method of "living"/controlled free radical polymerisation on arbitrary solid surfaces using initiator groups which, by virtue of their stability, are easy to handle and use and which have the characteristic of enabling "living"/controlled free radical polymerisation in accordance with the ATRP-mechanism at temperatures of below 120° C., without thermal polymerisation taking place at the same time to a significant extent.

DETAILED DESCRIPTION OF THE INVENTION

Figure 1:
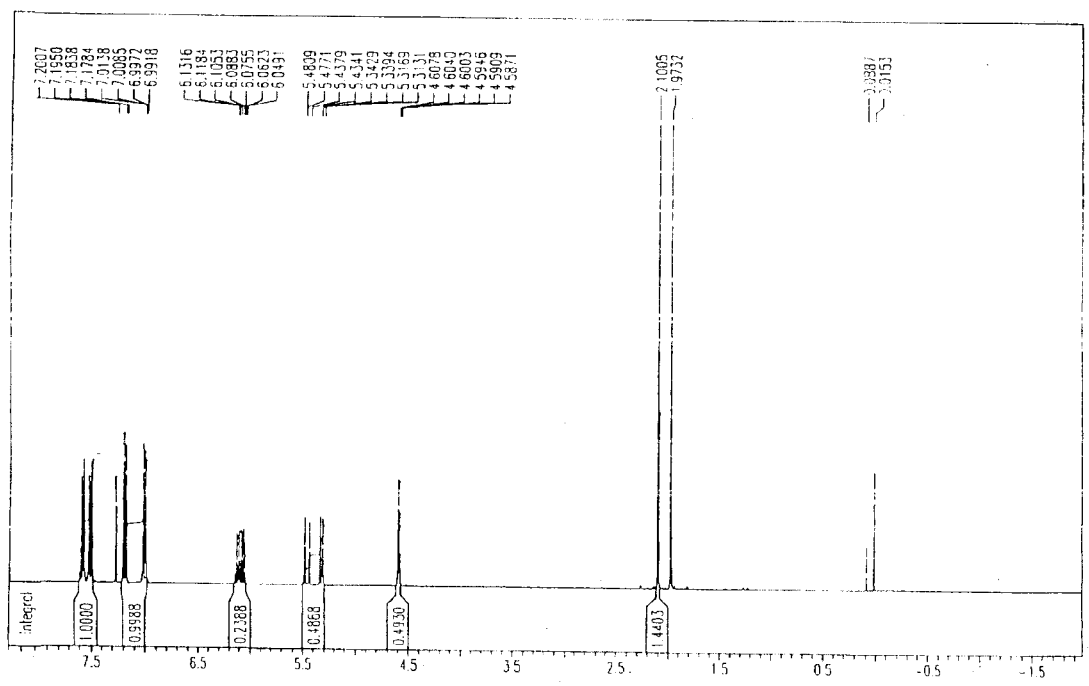
FIG. 1 shows the $^1$H-NMR-spectrum of compound (31).

The solid can consist of any material, can be of a solid or porous nature, can be in finely divided form, can be of natural or synthetic origin, or can have a heterogeneous surface structure or heterogeneous surface composition. The only prerequisite is that the solid used already exhibits chemical properties on its surface or that chemical properties which allow the binding of chemical compounds via primary valency bonds can be produced thereon; here the term "primary valency bond" is to be understood as the entire spectrum of chemical bonds covered by the three limiting cases of covalent, ionic and metallic bond as well as the transitions between the three limiting cases. Solids which inherently already have the suitable chemical nature for binding chemical compounds have, for example, hydroxyl groups on their surface. On the other hand it is known that surfaces of non-polar substances as well, such as, for example, poly(propylene) or poly(tetrafluorethylene) can be equipped with reactive groups, for example hydroxyl groups, without any problem, for example by means of plasma treatment.

In addition to hydroxyl groups, further functional groups which may be mentioned which are capable of forming, on a solid surface, primary valency bonds to initiators that are applied to the surface are, for example, those such as —O—, —SH, —S—, —S—S—, -halogen, —NH$_2$, —NHR, —NR$_2$ —NH$_3^+$, —NH$_2$R$^+$, —NHR$_2^+$, —NO$_2$, —NO$_3^-$, —C≡N, —CO—, —CRH—CO—, —COOH, COO$^-$, —COCl, —CO—O—, —CO—NH—, —SO$_3^-$, —SO$_2$Cl, —PO$_3^-$, —PO$_2$Cl, —CO—S—, —CS—O—, —C=C—, —C≡C— and aryl. In these groups the substituent R can in each case be independently selected from the group: H, alkyl, preferably methyl to propyl, aryl, included substituted aryl, preferably phenyl, and also mixed alkyl and aryl. Solid surfaces that are suitably reactive can be chemically modified by the process according to the invention.

According to the invention, this modification of solid surfaces is carried out in the following way:

Such chemical compounds of the general formula 1 A-L-I, which are hereinafter designated initiators, are bound to a solid surface, which is to be chemically modified and is suitably reactive to be capable of forming primary valency bonds to chemical compounds via chemical reactions (see above) The initiator group I which is present as a component of A-L-I and from which the polymer growth proceeds in accordance with the ATRP-mechanism corresponds to C—Z' according to Formula III of the patent WO 98/01480 of K. Matyjaszewski et al. The choice of initiator group is dependent on the desired reaction conditions and the monomer to be polymerised.

In the compounds of the general formula 1 at least one anchor group A, as specified further below, must be present, which is capable, with the functional groups present on the solid surface, of achieving, via a reaction, binding of the compound 1 at the surface in the form of a chemical primary valency bond. This bond must be stable under the particular given reaction conditions for the "living"/controlled free radical polymerisation.

Furthermore, formation of the bond must itself proceed under reaction conditions under which, matched to the particular initiator group I from which the polymer growth proceeds in accordance with the ATRP mechanism, this is stable.

All types of reaction by means of which bonds can be newly linked can be used for carrying out the binding of compounds of the general formula 1 A-L-I to solid surfaces. Whether or not a solvent is necessary, and, if so, which solvent is employed depends on the particular reactants. Furthermore, the selection of further process chemicals depends on the particular type of reaction by means of which the binding of the initiator to the solid surface is carried out.

These requisite preconditions for suitability as an anchor group are met by a multiplicity of groups or structural elements. The following functional groups may be mentioned by way of example:

| Anchor group A in A-L-I of the general formula 1 A = | | | | |
|---|---|---|---|---|
| OH | CO—CH=$CR_2$ | NR—OH | $PO_3^-$ | $SO_2Cl$ |
| Halogen | CO—$NR_2$ | NH—C(NR)—$NH_2$ | O—$PO_2Cl$ | SOCl |
| $SiR^3_y R^4_z X_{3-(y+z)}*)$ | C≡N | CO—NR—$NR_2$ | $PO_2Cl$ | ![epoxide with R,R] |
| CR=CR**) | NH—C≡N | CH=CR—$NR_2$ | COSR | ![thiirane with R,R] |
| CR=$CR_2$ | $NH_2$ | CO—N=C=S | CSOR | ![aziridine N-R with R,R,R,R] |
| C≡CR | NHR | N=C=O | CS—$NR_2$ | |
| CRO | $NR_2$ | N=C=S | CSSR | |
| COOR | $NH_3^+$ | O—C≡N | SH | |
| $COO^-$ | $NH_2R^+$ | S—C≡N | $SO_3R$ | |
| COCl(Br) | $NHR_2^+$ | $NO_3^-$ | $SO_2R$ | |
| CO—O—CO—R | NH—COOR | $N^+$≡N | SOR | |
| CH(OH)(OR) | C(NR)—CH=$CR_2$ | N=P(phenyl)$_3$ | $SO_3Cl$ | |
| $C(OR)_3$ | NR—$NR_2$ | CH=P(phenyl)$_3$ | $SO_3^-$ | |

*)X = halogen, $OR^6$, $NH_2$, with $R^6$ as well as $R^3$ and $R^4$ = alkyl, including branched, preferably methyl, ethyl, including unsaturated, also cycloalkyl, preferably cyclohexyl, including substituted, aryl, preferably phenyl, including substituted, (y + z) ≦ 2
**)R = a substituent, in each case independently selected from the group:: H, alkyl, preferably methyl to propyl, aryl, including substituted, preferably phenyl, also mixed alkyl and aryl; applies in respect of all R in this table that have no labels.

Furthermore, the anchor group A can be a metal radical M, with which A-L becomes a group in the sense of an organometallic reagent M-L. In a chemically meaningful manner, matched to L and also matched to the type of the functional groups on the solid surface, via which the reaction with the anchor group A=M is to be carried out, M is so chosen that crosslinking reactions can be carried out with the reactants M-L and functional groups on the solid surface. M-L can thus be organometallic groups containing lithium (Murahashi), sodium, magnesium (Grignard, Kumada-Tameo, Corriu), boron (Suzuki-Miyaura), aluminium (Nozaki-Oshima, Negishi), zirconium (Negishi), zinc (Negishi, Normant) copper or copper-lithium or copper-zinc (Normant, Sonogashira), tin (Migita-Kosugi, Stille), silicon (also variants of Hiyama), mercury, cadmium and silver. For carrying out the crosslinking reactions it is also necessary to use a suitable catalyst and for the particular functional groups on the solid surface, as electrophilic reactant, to have the characteristic of being a suitable leaving group. Depending on the organometallic group M-L, a suitable catalyst is an elementary metal or a compound (salt or complex) of the metals Pd(0), Pd(II), Ni(0), Ni(II), Pt(0), Cu(I), Co(II), Co(III), Fe(I), Fe(III) or Mn(II). If appropriate, mixtures of two catalysts, the addition of a co-catalyst (for example Zn) or catalyst compounds which contain two metals, such as, for example, $Li_2CuCl_4$ are also used. Pd and Ni catalysts are of primary importance.

C—C bonds in which the C atoms participating in the bond have identical or different hybridisation can be linked by means of crosslinking reactions of this type. The reaction conditions required in the individual case are known from the literature under the abovementioned authors' names.

The structural element L present as a constituent of A-L-I can be selected independently from the following list 1–3:
1. L is a structural element which according to Formula III in Patent WO 98/01480 of K. Matyzaszewski et al. possesses the groups $R^{11}$, $R^{12}$, $R^{13}$ which are specified in said patent and are each selected independently of one another in a chemically meaningful manner, where at least one H or halogen in all three, preferably in two, but particularly preferentially in one of the groups $R^{11}$, $R^{12}$, $R^{13}$ is A. (Note: only the group definitions for $R^{11}$, $R^{12}$, $R^{13}$ correspond to those in Patent WO 98/01480 of K. Matyzaszewski et al.). Moreover, at least one H or halogen in all three, only in two or also only in one of the groups $R^{11}$, $R^{12}$, $R^{13}$ can also be I. Functional groups, which in patent WO 98/01480 of K. Matyzaszewski et al. are encompassed by the variability of $R^{11}$, $R^{12}$, $R^{13}$, can already perform the function of anchor groups A here or they can serve for introduction of A.
2. L is a structural element, in which all groups $R^{11}$, $R^{12}$, $R^{13}$ (according to Formula III of patent WO 98/01480 of K. Matyzaszewski et al.) or two of these groups or even only one group, have been replaced by a) oligo(oxyalkylene) with $C_1$ to $C_{20}$, also alternating $C_1$ and $C_2$ groups, b) oligo(ethyleneimine), c) oligosiloxanyl with $Si_1$ to $Si_{20}$, $SiR^1R^2$ with $R^1$ and $R^2$ being alkyl, preferably methyl, also aryl, preferably phenyl, also mixed alkyl and aryl, where in a) to c) at least one H, in c) at least H or also at least one aryl is A in all three, preferably in two, but particularly preferentially in one of the groups $R^{11}$, $R^{12}$, $R^{13}$. Moreover, in a) to c) at least one H, or in c) at least one H or one aryl can also be I in all three, only in two or also only in one of the groups $R^{11}$, $R^{12}$, $R^{13}$.

3. L is a structural element, in which a group $R^5$ optionally contained in the groups $R^{11}$, $R^{12}$, $R^{13}$ (according to Formula III in patent WO 98/01480 of K. Matyzaszewski et al.) is, going beyond the specification in patent WO 98/01480, one of the following groups:

a) oligo(oxyalkylene) with $C_1$ to $C_{20}$, also alternating $C_1$ and $C_2$ groups, b) oligo(ethyleneimine), c) oligosiloxanyl with $Si_1$ to $Si_{20}$, $SiR^1R^2$ with $R^1$ and $R^2$ being alkyl, preferably methyl, also aryl, preferably phenyl, also mixed alkyl and aryl, where in a) to c) at least one H, in c) at least H or also at least one aryl is A in all three, preferably in two, but particularly preferentially in one of the groups $R^{11}$, $R^{12}$, $R^{13}$. Moreover, in a) to c) at least one H, or in c) at least one H or one aryl can also be I in all three, only in two or also only in one of the groups $R^{11}$, $R^{12}$, $R^{13}$.

The suitable choice of L offers the possibility of cleavage of the polymer layer from the solid surface via functional groups contained in L.

Silyl compounds of the formula 2

$$X_{3-(y+z)}R^3{}_yR^4{}_z\text{Si-L-I} \qquad 2$$

always with $(y+z) \leq 2$ where X=halogen, $OR^6$ or $NH_2$ and $R^6$, $R^3$, $R^4$=alkyl, including branched, preferably methyl, ethyl, including unsaturated, also cycloalkyl, preferably cyclohexyl, including substituted, aryl, preferably phenyl, including substituted, and furthermore L=a chemical bond or an inorganic or organic group variable within wide limits, as specified further above, and, furthermore, I=an initiator group for the "living"/controlled free radical polymerisation in accordance with the ATRP-mechanism, as specified further above, have been found to be suitable for binding to solids, especially to those that have OH groups and particularly those that have Si—OH groups.

The initiator molecule can be bonded to the solid surface (in this example a silicate surface and y=z=0) via the silyl anchor group A:

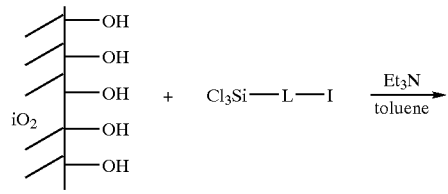

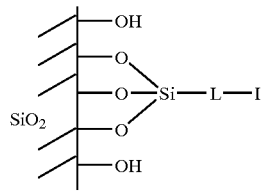

Depending on the number of reactive groups, the silyl anchor group A is tri, di-, or monofunctional. Preferably chlorine is used as halogen, since a large number of compounds exist and their price is reasonable. The choice of solvent depends on the reactants employed. With chlorine as halogen the reaction is preferably carried out in the presence of an ancillary base, for example triethylamine, and in a dry organic solvent.

In addition to the linkages of the solid surface to the initiator which have been indicated above by way of example, those linkages that are formed by a sulphide, disulphide, ether, ester, thioester, sulphonate, amide, amine, C—C— or C—N— bond or by the interaction between counterions are also possible. These linkages can be produced by substitution, addition or condensation reactions. The reactions necessary for this purpose have long been known in the field of organic synthesis, as have the solvents advantageously to be used and other process chemicals and process parameters.

Carboxylic acid derivatives 3 have proved suitable for binding to solids, especially to those which have OH groups. In formula 3 L and I are as specified above.

$$\text{Y—CO-L-I} \qquad 3$$

where: Y=halogen, preferably chlorine or bromine, OH, $OR^7$, where $R^7$=alkyl, preferably methyl or ethyl, aryl, preferably phenyl, including substituted, aralkyl, preferably benzyl, acyl, aliphatic or aromatic, or trialkylsilyl, preferably trimethylsilyl.

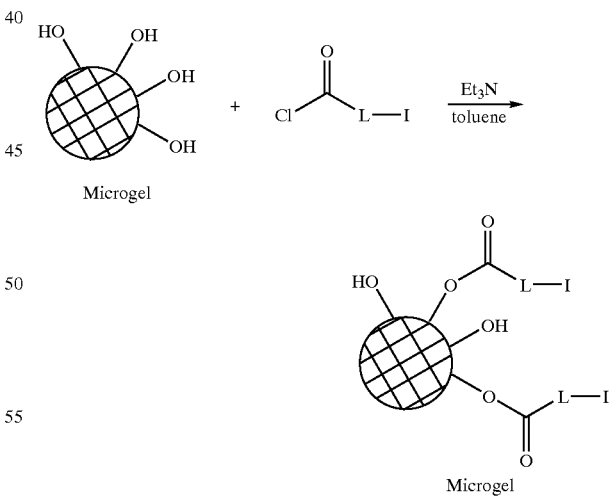

Thiol and disulphide anchor groups of the general formula (sic) 4 and 5

HS-L-I      4

I-L-S—S-L-I      5 have proved suitable for binding to semi-noble metals or noble metals, the solid surface of which has not been provided with functional groups.

In formulae 4 and 5 L and I are as specified above.

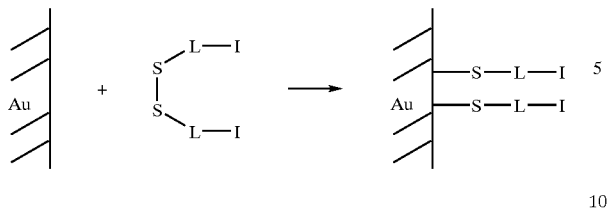

As specified above, the initiators of type 1–6 mentioned above and below can have a bond that is can be cleaved under suitable conditions, for example an ester function, in their structural element L. According to the invention, a bond that can be cleaved is established in particular with a view to the analysis of the polymers formed on the solid surface, if statements are also to be made with regard to the molar masses, the distribution thereof and the number of polymer chains formed.

Compounds of the general formula A-L-I 1 are employed as initiators that are capable of initiating a "living"/controlled free radical polymerisation in accordance with the ATRP mechanism on solid surfaces.

The constituents A, L and I contained in 1 can each independently be chosen from the specifications given above for A, L, and I.

If A in 1 is advantageously selected from the above specification, the resulting initiators are compounds of the formulae 2–6:

$$X_{3-(y+z)}R^3{}_yR^4{}_zSi\text{-}L\text{-}I \qquad 2$$

$$Y\text{—}CO\text{-}L\text{-}I \qquad 3$$

$$HS\text{-}L\text{-}I \qquad 4$$

$$I\text{-}L\text{-}S\text{—}S\text{-}L\text{-}I \qquad 5$$

$$=\text{-}L\text{-}I \qquad 6$$

In these formulae X, Y, $R^3$, $R^4$, L, I, y and z are as specified above.

If L in 1 is advantageously selected from the above specification, L is a chemical bond; $C_1$ to $C_{20}$, preferably $C_1$ to $C_8$ alkyl; aryl, preferably phenyl, including substituted; aralkyl in which the aryl component is preferably phenyl and the alkyl component is $C_1$ to $C_{20}$; or a structural element, with which the resulting initiators are compounds of the formulae 7 to 11:

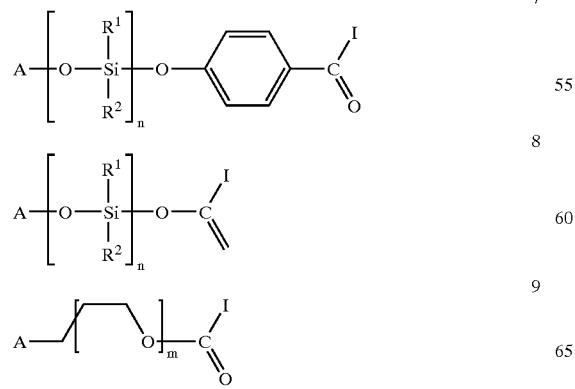

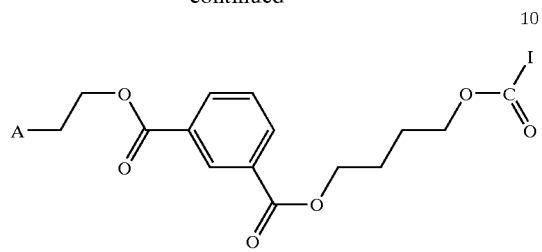

In these formulae $R^1$ and $R^2$=alkyl, preferably methyl, also aryl, preferably phenyl, also mixed alkyl and aryl. Furthermore, in these formulae n=1-20 and m=1-20. Furthermore, in these formulae A and I are as specified above.

If I in 1 is advantageously selected from the above specification, the resulting initiators are, for example and particularly advantageously, compounds of the formulae 12–28:

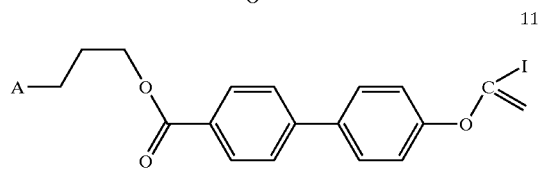

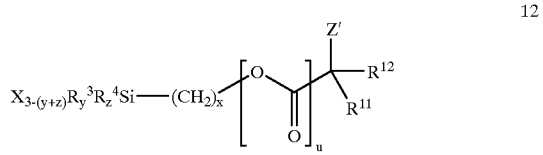

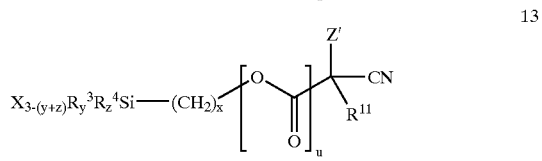

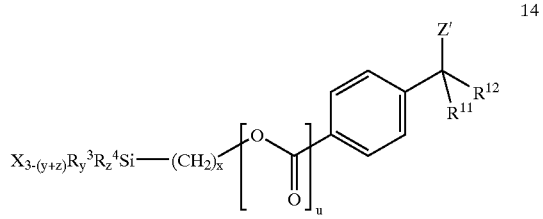

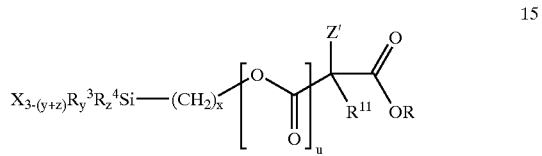

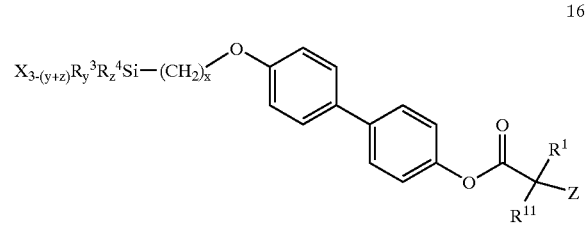

17

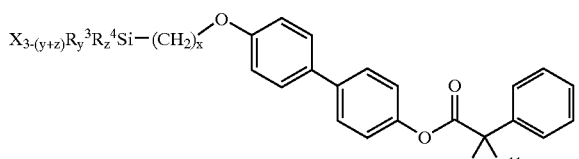

18

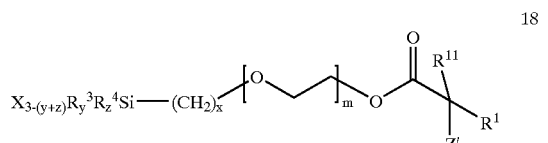

19

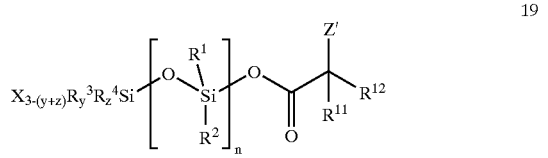

20

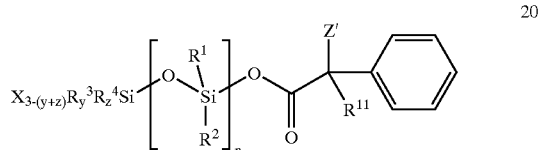

21

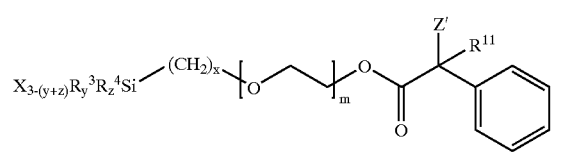

22

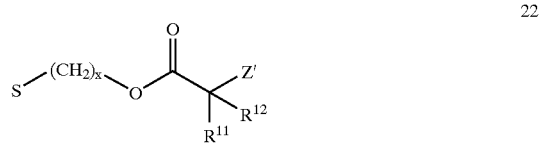

23

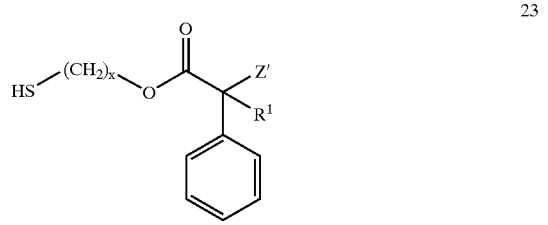

24

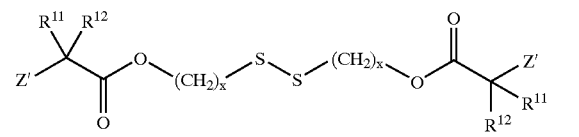

25

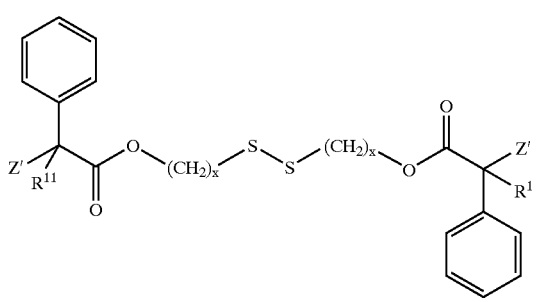

26

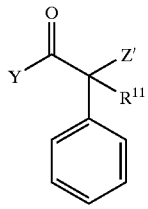

27

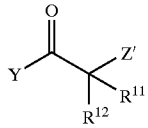

28

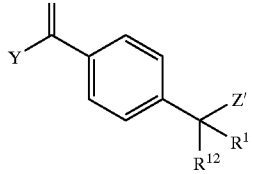

y, z=0, 1, 2, with (y+z)≦2 x=1–20 m=1–20

$R^1$, $R^2$=definition in siloxane linkage L, as specified above $R^3$, $R^4$=definition of the silyl anchor, as specified above $R^8$=H, alkyl, preferably methyl or ethyl $R^{11}$, $R^{12}$=substituents according to formula III in the Patent WO 98/01480 of K. Matyjaszewski et al. which can be selected independently of one another X=as specified above Y=as specified above Z'=atom or group that is transferable by the ATRP-mechanism, according to patent WO 98/01480 of K. Matyjaszewski et al., preferably Br or Cl.

Starting from the ATRP initiators bound to the solid surface, a "living"/controlled free radical polymerisation is carried out with monomers capable of free radical polymerisation. Monomers capable of free radical polymerisation are advantageously styrene and its derivatives, acrylates, methacrylates and acrylonitrile, but also macromonomers and in general all compounds equipped with a C—C-double bond capable of polymerisation, it also being possible to use different monomers as a mixture or after one another in order to produce a copolymer or block copolymer on the solid surface. The oligomer or polymer chains formed on the solid surface in a "living"/controlled free radical polymerisation reaction can be straight-chain or branched. In a "living"/controlled free radical polymerisation each chain, once it has been started by an initiator, continues to grow as long as monomers are still present in the reaction mixture. Since the polymerisation is a "living" polymerisation, the chain ends continue to remain active after complete consumption of the monomer, i.e. they are capable of further "living"/controlled free radical polymerisation reactions. For this reason solid particles from which the "living"/controlled free radical polymerisation is initiated are and remain individual solid particles during the polymerisation and also after the polymerisation.

Starting from the still active chain ends of the polymer chains of the first generation, a second generation polymer layer can be produced on the first polymer layer by means of a fresh "living"/controlled free radical polymerisation. This second generation polymer layer can consist of polymer or macromonomer species that differ from those of the first generation polymer layer or of a mixture of various monomer or macromonomer species or of mixtures of monomers and macromonomers. The second generation polymer layer is linked to the first generation polymer layer by chemical primary valency bonds.

Further generations of polymer layers can be polymerised onto the second generation polymer layer in the same way, as required, so that tailored layer systems can be produced, the bonds between the layers with one another and between the first layer and the solid being via chemical primary valencies in each case.

It is furthermore preferred that the polymer layers can be modified, for example by chemical conversions of functional groups of the oligomer or polymer chains bound to the solids, by means of suitable reactants with retention of the degree of polymerisation. Here the functional groups can be provided by each individual monomer unit or, alternatively, by the "living" end group. Suitable reactants can be low-molecular or high-molecular compounds or mixtures of these.

It is furthermore preferred chemically to bind the solid polymer layer systems produced in three-dimensional polymer matrices by means of crosslinking reactions.

Oligomers or polymer layers produced by the process according to the invention and also the initiators of the general formula 1, for which, on the one hand, formulae 2–28 below and, on the other hand and in particular, formulae 29–39 given in Examples 1–11 are examples, are a further subject of the invention. The constituents A, L and I contained in formulae 1–11 can each be selected independently from the specifications for A, L and I given above.

| | |
|---|---|
| A-L-I | 1 |
| $X_{3-(y+z)}R^3{}_yR^4{}_z$Si-L-I | 2 |
| Y—CO-L-I | 3 |
| HS-L-I | 4 |
| I-L-S—S-L-I | 5 |
| =-L-I | 6 |

In these formulae X, Y, $R^3$, $R^4$, y and z are as specified above.

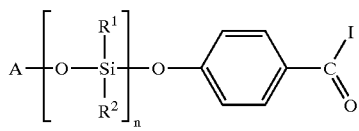

7

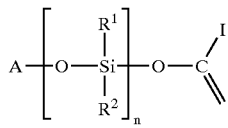

8

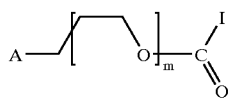

9

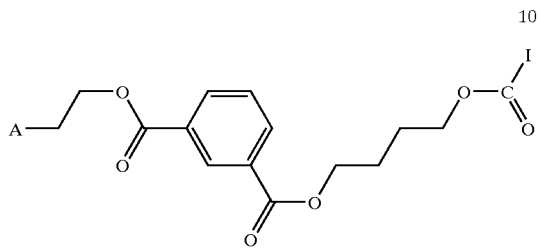

10

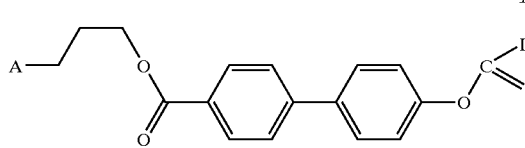

11

In these formulae $R^1$ and $R^2$=alkyl, preferably methyl, also aryl, preferably phenyl, also mixed alkyl and aryl. Furthermore, in these formulae n=1-20 and m=1-20. Furthermore, in these formulae A and I are as specified above.

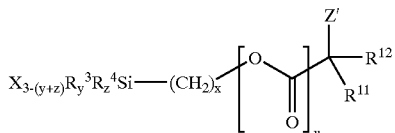

12

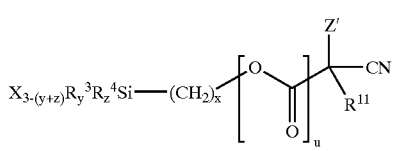

13

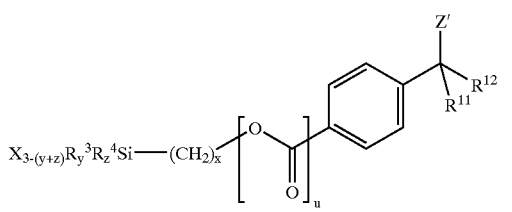

14

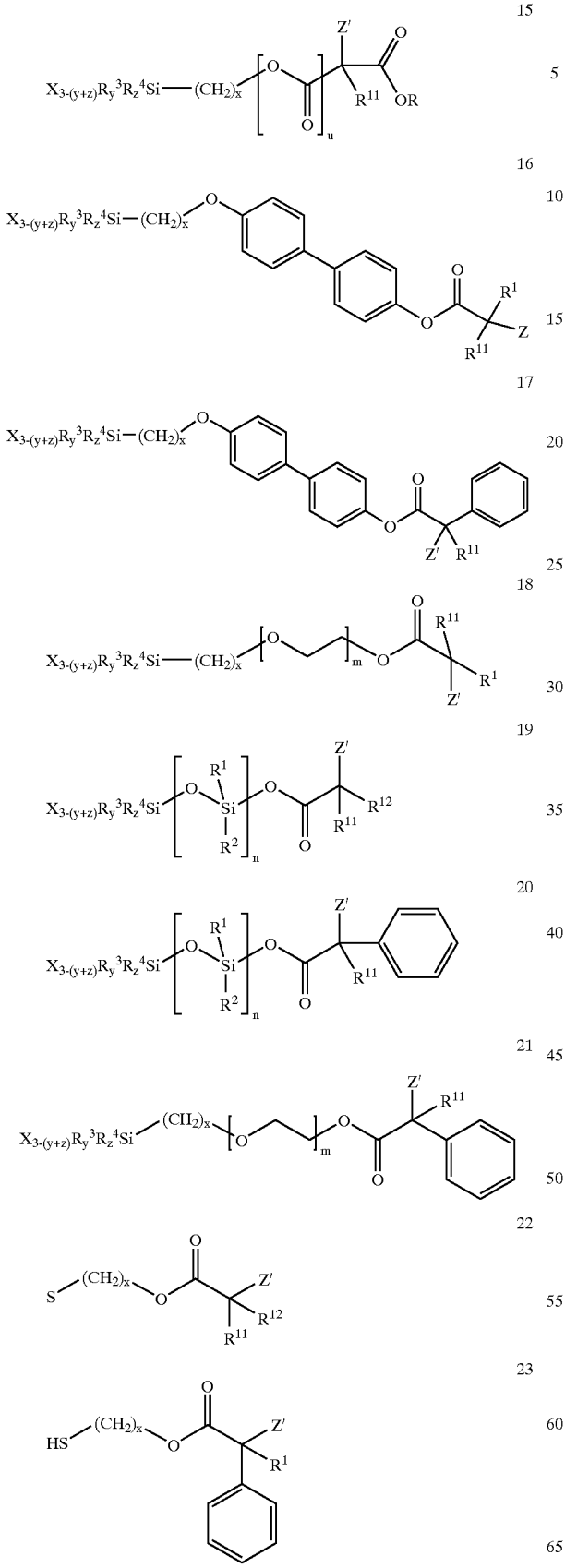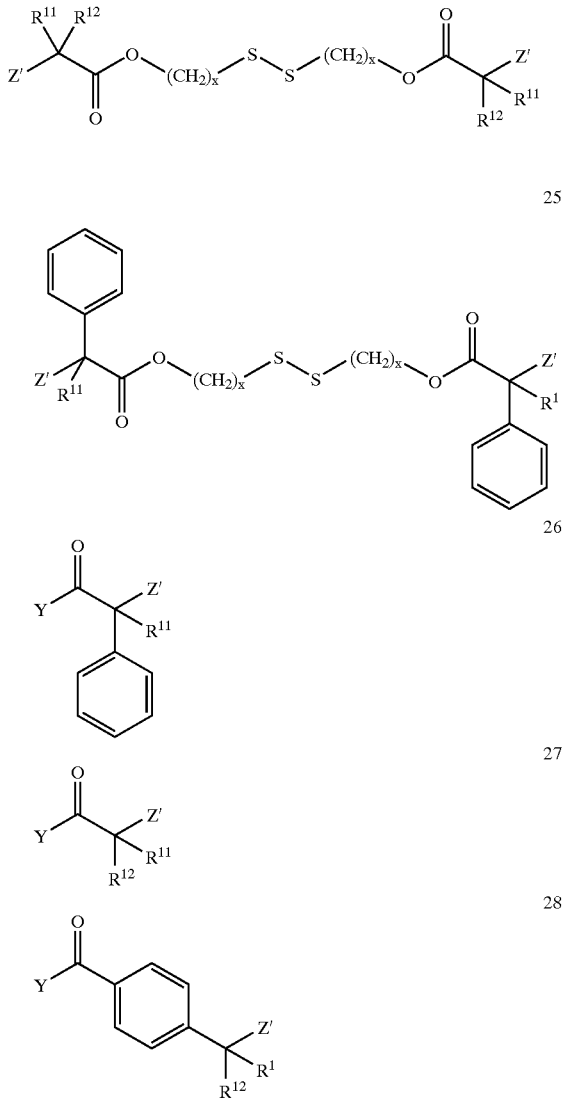

y and z=0, 1, 2, with (y+z)≦2
x=1-20
m=1-20
n=1-20
u=0, 1
$R^1$, $R^2$=definition in siloxane linkage L, as specified above
$R^3$, $R^4$=definition of the silyl anchor, as specified above
$R^8$=H or alkyl, preferably methyl orethyl
$R^{11}$, $R^{12}$=substituents according to formula III in patent WO 98/01480 of K. Matyjaszewski et al. that can be selected independently of one another
X=as specified above
Y=as specified above
Z'=atom or group according to patent WO 98/01480 of K. Matyjaszewski et al., that can be transferred by the ATRP-mechanism, preferably Br or Cl.

Using the process according to the invention it is possible to produce layers or layer systems which change characteristics of the original surfaces to such an extent that these are then determined only by the coating as such.

Typical surface characteristics are—in addition to the chemical reactivity—for example adhesion and permeation characteristics, surface tension, adsorptivity, optical characteristics such as, for example, reflectivity, surface conductivity, appearance, hardness, etc. There are thus countless possible applications for the subject according to the invention.

The process according to the invention can be used, for example

- to produce polymer-coated planar or non-planar solid surfaces, in order to be able to adjust the physical or chemical characteristics of these surfaces in a targeted manner for applications such as, for example, surface protection (abrasion, corrosion), physical interaction with the environment (slip behaviour, hardness), chemical surface reactivity, photoreactivity, optical characteristics, thermodynamic compatibility, etc.
- to produce, for example, porous, oligomer- or polymer-coated materials, in order to be able to adjust the permeation and/or sorption of gases and liquids in a targetted manner, for example for the purposes of the separation of different components,
- to produce polymer-coated solids and polymer-coated highly disperse solids in accordance with the core-shell principle, in order, using these as fillers, to be able to control a chemical binding of the dispersed phase to the surrounding continuous matrix (for example polymer matrix) in a targeted manner,
- to produce, in accordance with the core-shell principle, polymer-coated solids and polymer-coated highly disperse solids with a surrounding polymer fraction that can be controlled in a targeted manner, for the production of novel composite systems which it is possible to process above the glass transition temperature of the polymer coating.

Further possible applications lie in medical technology. Using the process according to the invention surfaces of implants of natural or synthetic origin can be so conditioned that improved binding of body cells is made possible and better incorporation of the implant is thus achieved. Furthermore, by applying suitable molecules chemically bound in the polymer to implant surfaces rejection reactions against the implant can be reduced.

The following examples are intended to explain the invention in more detail.

EXAMPLES

Initiators

1. Example

Initiator of the General Formula 3

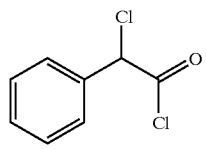

2-Chloro-2-phenylacetic acid chloride 29 is a suitable, commercially available initiator of the general formula 3; it corresponds to the more specific formula 26 where Z'=Cl, Y=Cl and $R^{11}$=H.

2. Example

Initiator of the General Formula 3

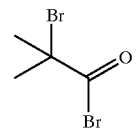

2-Bromo-2-methylpropionic acid bromide 30 is a suitable, commercially available initiator of the general formula 3; it corresponds to the more specific formula 27 where Z'=Br, Y=Br and $R^{11}$=methyl and $R^{12}$=methyl.

3. Example

Initiator of the General Formula 6

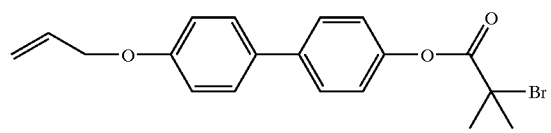

Tetrahydrofuran (THF) is dried by heating to the boil over sodium wire with reflux cooling. It is distilled off immediately prior to use.

Pryidine is dried over KOH and subjected to fractional distillation. 4-allyloxy-4'-hydroxybiphenyl is prepared in accordance with known literature [Finkelmann, H.; Lühmann, B.; Rehage, G.; Makromol, Chem. 186, 1095 (1985)]. 2-bromo-2-methylpropionic acid bromide 30 is subjected to fractional distillation under vacuum. Petroleum ether is subjected to fractional distillation, the fraction having the boiling range between 40° C. and 65° C. being used. Diethyl ether is distilled.

2.26 g (10 mmol) 4-allyloxy-4'-hydroxybiphenyl are dissolved in 100 ml absolute THF. 1 ml (12 mmol) pyridine is added to the solution and the solution is cooled to 0° C. in an ice bath. A solution of 1.5 ml (12 mmol) 2-bromo-2-methylpropionic acid bromide 30 in 20 ml absolute THF is then added dropwise to this solution. When the addition is complete, the mixture is warmed to room temperature and stirred for a further 6 h with the exclusion of moisture.

The batch is filtered and the solvent removed under vacuum. The residue is taken up in diethyl ether and the organic phase is washed with 0.5N HCl, saturated $NaHCO_3$ and water. The organic phase is dried over $Na_2SO_4$ and the solvent is removed under vacuum. After purification by column chromatography over $SiO_2$ using petroleum ether/diethyl ether (1/1 V/V) as the eluent, compound 31 is obtained.

Yield: 1.7 g of the initiator 31

Analyses: $^1H$ NMR, $^{13}C$ NMR

FIG. 1 shows the $^1H$ NMR-spectrum of compound 31

Figure 2:
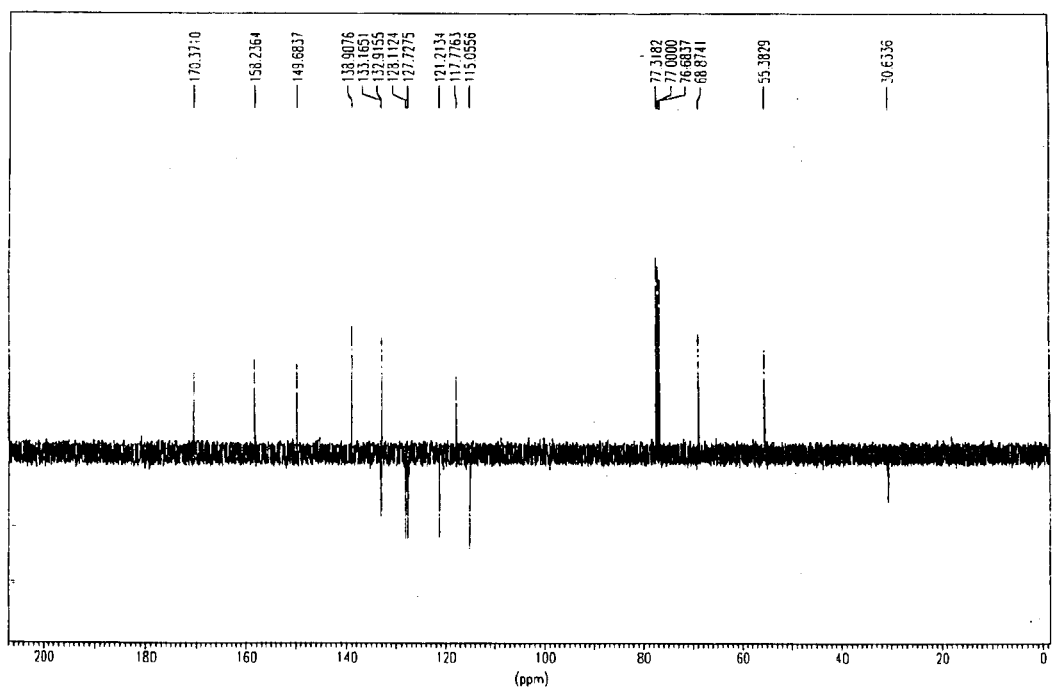
FIG. 2 shows the $^{13}$C-NMR-spectrum of compound (31).

FIG. 2 shows the $^{13}C$ NMR-spectrum of compound 31

Recording condition: solution of the initiator 31 in $CDCl_3$ with TMS as internal standard.

4. Example

Initiator of the General Formula 6

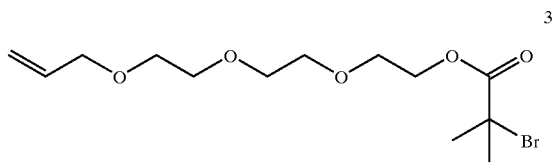

32

Dichloromethane is dried over CaH$_2$, distilled and stored over a 4 Å molecular sieve. Ethyl acetate is distilled. 2-(2-(2-allyloxy-ethoxy)-ethoxy)-ethanol is prepared in accordance with known literature [Mitchell, T. N.; Heesche-Wagner, J.; J. Organomet. Chem. 436, 43 (1992)]. The pretreatment of other chemicals and solvents has been described in Example 3 above.

2.85 g (15 mmol) 2-(2-(2-allyloxy-ethoxy)-ethoxy)-ethanol and 1.6 ml (20 mmol) pyridine are dissolved in 150 ml absolute dichloromethane. The solution is cooled to 0° C. in an ice bath with exclusion of moisture. A solution of 2.3 ml (19 mmol) 2-bromo-2-methylpropionic acid bromide 30 in 20 ml absolute dichloromethane is then added dropwise to this solution. When the addition is complete the mixture is warmed to room temperature and stirred for a further 6 h.

The batch is filtered and the solvent removed under vacuum. The residue is taken up in ethyl acetate and the organic phase is washed with 0.5N HCl, saturated NaHCO$_3$ and water. The organic phase is dried over Na$_2$SO$_4$ and the solvent is removed under vacuum. After purification by column chromatography over SiO$_2$ using ethyl acetate as the eluent, compound 32 is obtained.

Yield: 3.82 g of the initiator 32

Analyses: $^1$H NMR, $^{13}$C NMR

Figure 3:
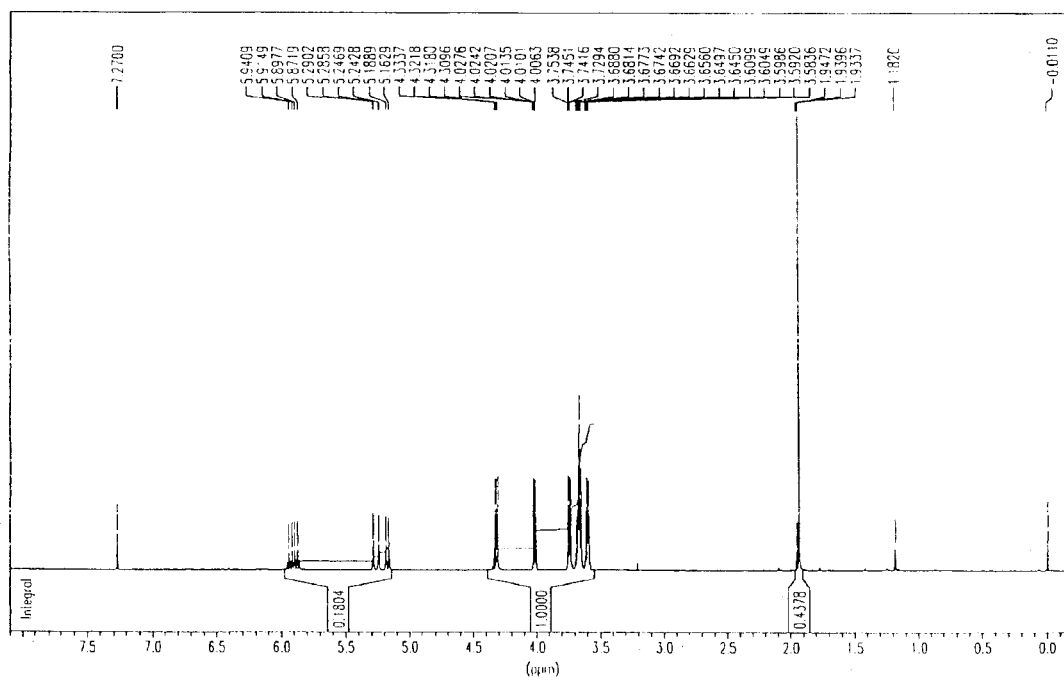
FIG. 3 shows the $^1$H-NMR-spectrum of compound (32).

FIG. 3 shows the $^1$H NMR-spectrum of compound 32

Figure 4:
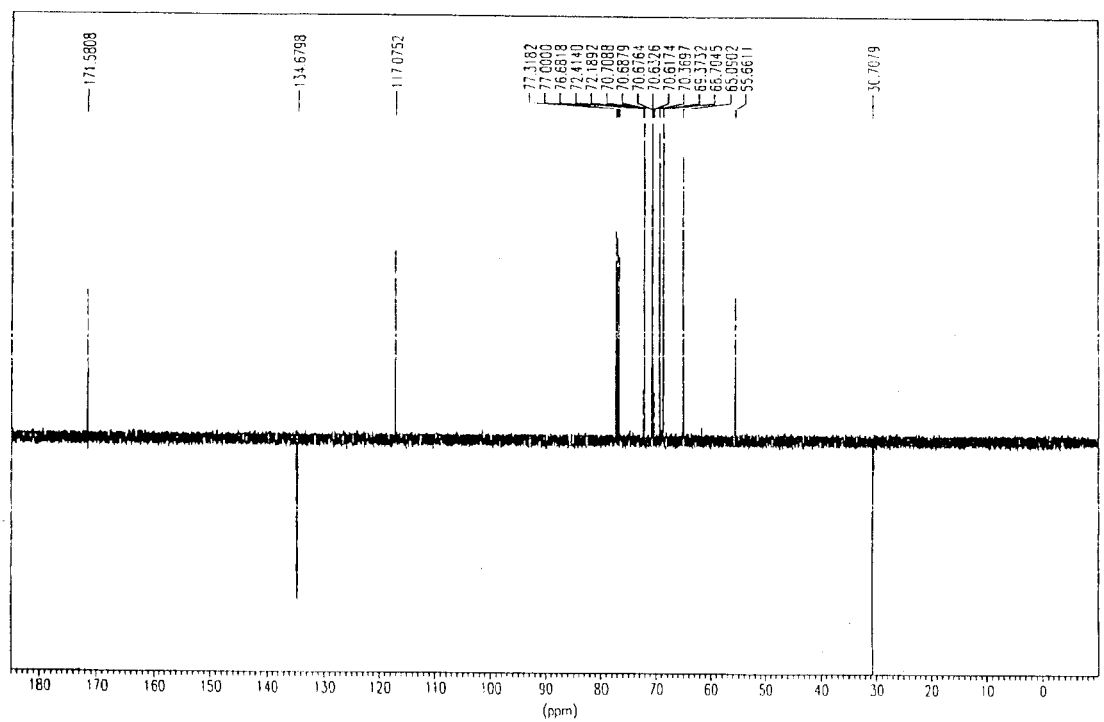
FIG. 4 shows the $^{13}$C-NMR-spectrum of compound (32).

FIG. 4 shows the $^{13}$C NMR-spectrum of compound 32

Recording condition: solution of the initiator 32 in CDCl$_3$ with TMS as internal standard.

5. Example

Initiator of the General Formula 6

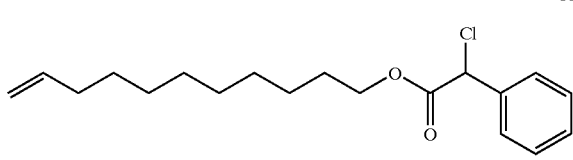

33

2-Chloro-2-phenylacetic acid chloride 29 is subjected to fractional distillation under vacuum. Triethylamine is dried over CaH$_2$ and distilled under blanketing gas. 10-undecen-1-ol is used without further purification. The pretreatment of other chemicals and solvents has been described in Examples 3 and 4 above.

6 ml (29.8 mmol) 10-undecen-1-ol and 4.6 ml (33 mmol) triethylamine are dissolved in 150 ml dichloromethane. The solution is cooled to 0° C. in an ice bath and a solution of 4.8 ml (33.1 mmol) 2-chloro-2-phenylacetic acid chloride 29 in 50 ml absolute dichloromethane is added at this temperature with exclusion of moisture and light. When the addition is complete, the reaction mixture is warmed to room temperature and stirred for a further 6 h.

The reaction mixture is transferred to a separating funnel and is washed with 0.5N HCl, saturated NAHCO$_3$ and distilled water, using 150 ml in each case. The organic phase is separated off and dried over Na$_2$SO$_4$ and the solvent is removed under vacuum. After purification by column chromatography over SiO$_2$ using petroleum ether/ethyl acetate (10/1 V/V), the product, 2-chloro-2-phenylacetic-acid 10'-undecenyl ester 33, is isolated.

Yield: 5.7 g of the initiator 33

Analyses: $^1$H NMR, $^{13}$C NMR

Figure 5:
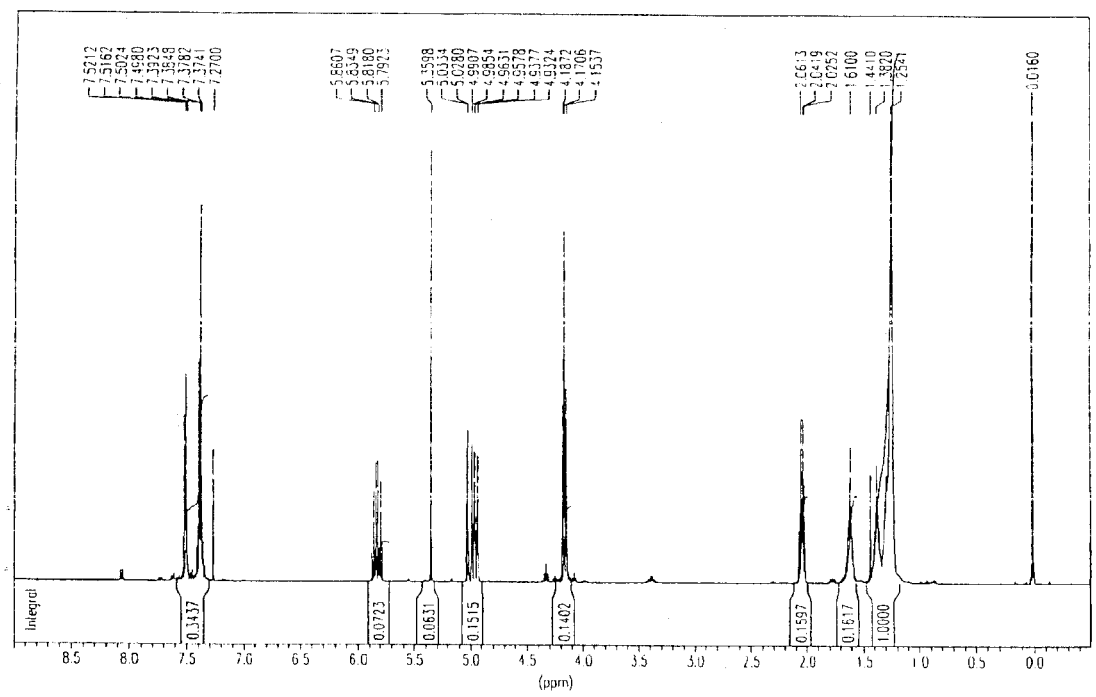
FIG. 5 shows the $^1$H-NMR-spectrum of compound (33).

FIG. 5 shows the $^1$H NMR-spectrum of compound 33

Figure 6:
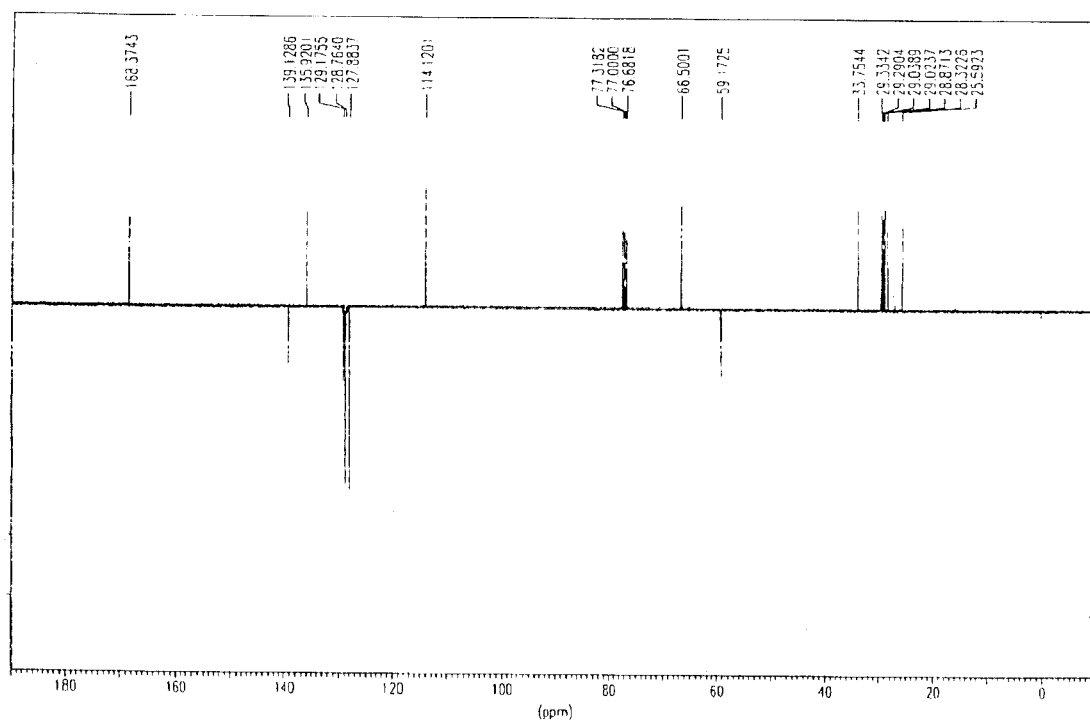
FIG. 6 shows the $^{13}$C-NMR-spectrum of compound (33).

FIG. 6 shows the $^{13}$C NMR-spectrum of compound 33

Recording condition: solution of the initiator 33 in CDCl$_3$ with TMS as internal standard.

6. Example

Initiator of the General Formula 6

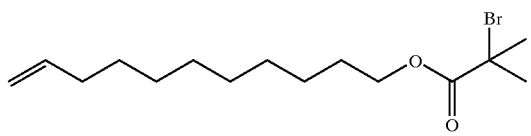

34

2-Bromo-2-methylpropionic acid bromide 30 is distilled under vacuum. The pretreatment of other chemicals and solvents has been described in Examples 3–5 above.

The reaction procedure and working up and isolation of the product 34 is (sic) carried out as described in Example 5. Deviating from this, 4 ml (32.4 mmol) 2-bromo-2-methylpropionic acid bromide 30 are employed instead of 29.

Yield: 6.7 g of the initiator 34

Analyses: $^1$H NMR, $^{13}$C NMR

Figure 7:
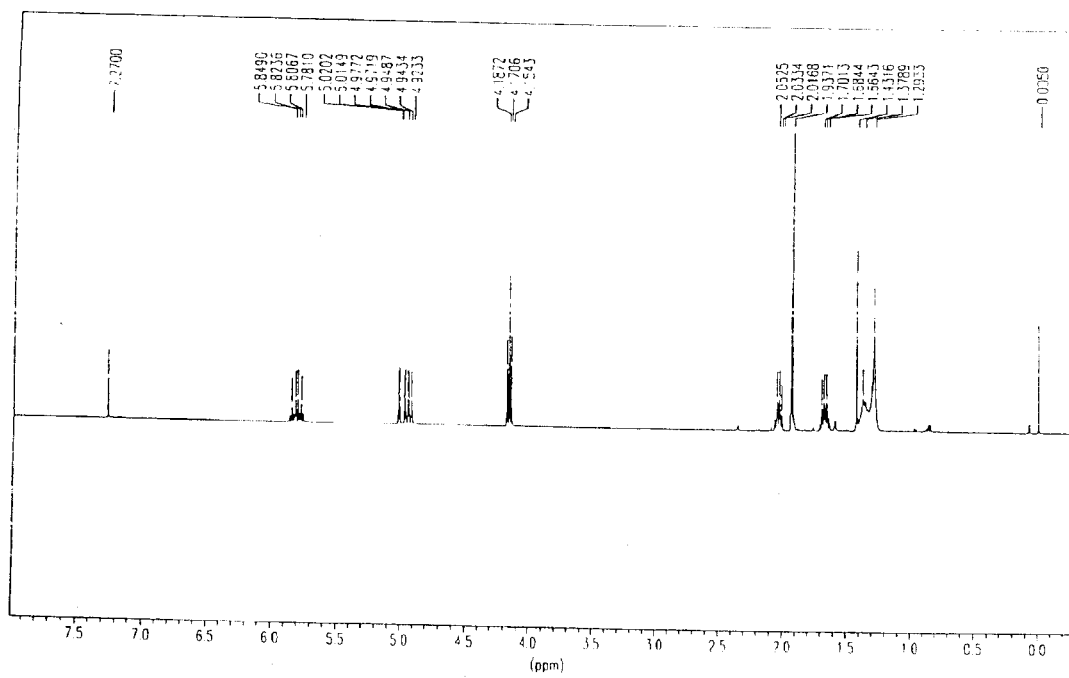
FIG. 7 shows the $^1$H-NMR-spectrum of compound (34).

FIG. 7 shows the $^1$H NMR-spectrum of compound 34

Figure 8:
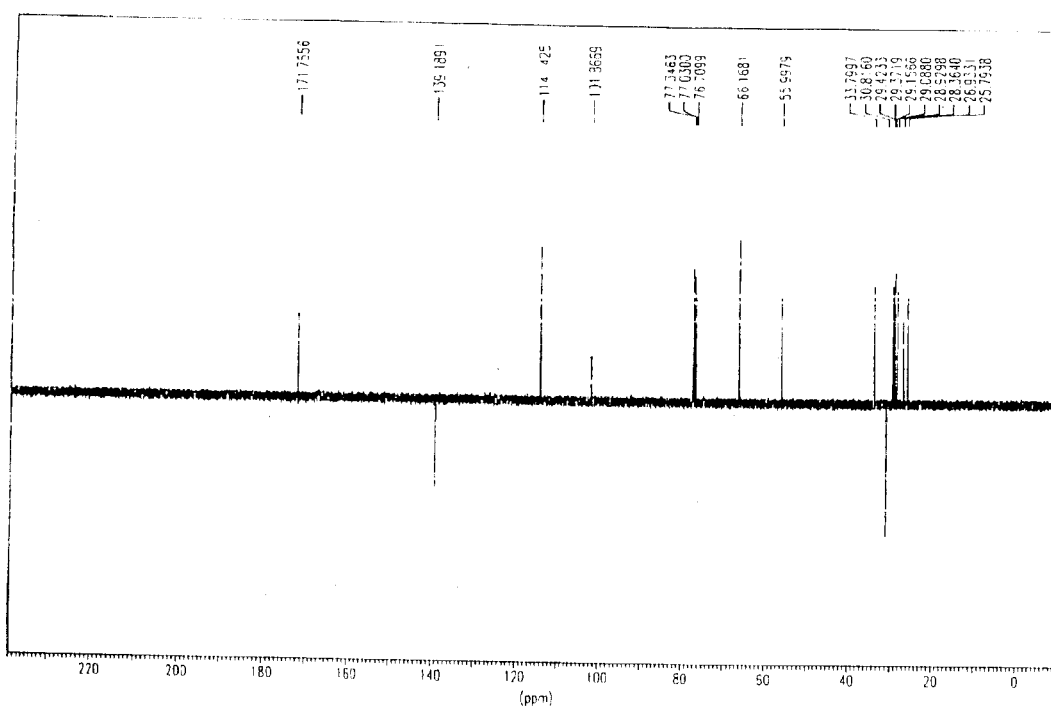
FIG. 8 shows the $^{13}$C-NMR-spectrum of compound (34).

FIG. 8 shows the $^{13}$C NMR-spectrum of compound 34

Recording condition: solution of the initiator 34 in CDCl$_3$ with TMS as internal standard.

7. Example

Initiator of the General Formula 2

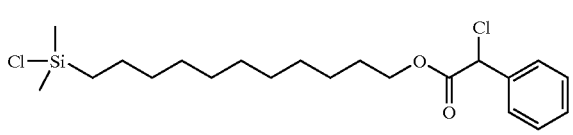

35

Chlorodimethylsilane is distilled with the exclusion of moisture. Ethanol is distilled. Hexachloroplatinic acid hexahydrate and dimethoxyethane are employed without further purification. The pretreatment of dichloromethane has been described in Example 4 above.

5 g (15.5 mmol) of compound 33 are added to 40 ml (368 mmol) chlorodimethylsilane. A solution of 30 mg hexachloroplatinic acid hexadyrate in 0.5 ml dimethoxyethane/ethanol (1/1 V/V) is added with the exclusion of moisture and the reaction mixture is stirred overnight at room temperature under blanketing gas.

For working up the excess chlorodimethylsilane is distilled off and the residue is taken up in 20 ml absolute dichloromethane. The solution is filtered through finely powdered $Na_2SO_4$ and the solvent is removed under vacuum. The initiator 35 is used without further purification.

The initiator 35 corresponds to the more specific formula 12, where u=1, x=11, y=1, z=1, Z'=Cl, X=Cl, $R^3$=methyl, $R^4$=methyl, $R^{11}$=phenyl and $R^{12}$=H.

Yield: approximately 6 g of the initiator 35

Analysis: FT-IR

Figure 9:
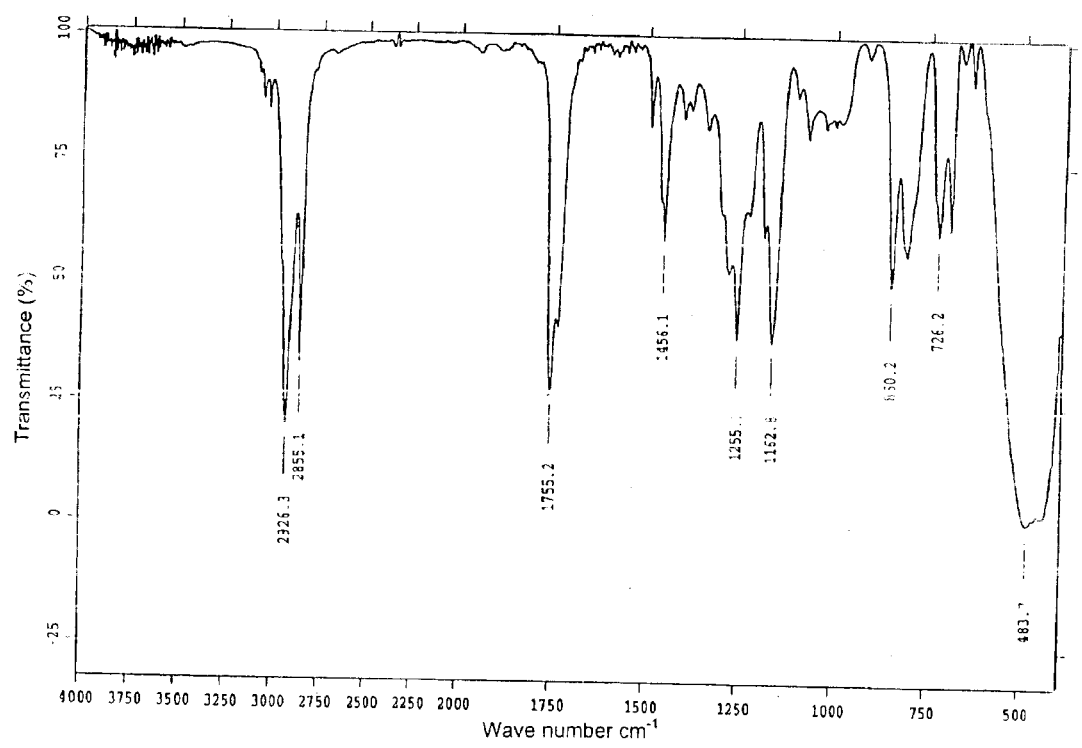
FIG. 9 shows the FT-IR spectrum of initiator (35).

FIG. 9 shows the FT-IR spectrum of initiator 35

Recording technique: transmission spectrum of 35 as film between NaCl windows.

8. Example

Initiator of the General Formula 2

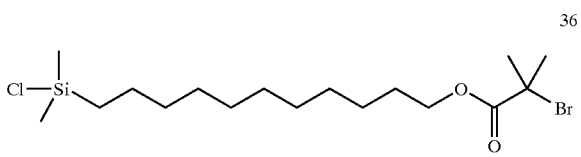

The reaction procedure and working up and isolation of the product 36 is (sic) carried out as described in Example 7. Deviating from this, 4.9 g (15.4 mmol) 2-bromo-2-methylpropionic acid 10'-undecenyl ester 34 are employed instead of 33.

The initiator 36 corresponds to the more specific formula 12 where u=1, x-=11, y=1, z=1, Z'=Br, X=Cl, $R^3$=methyl, $R^4$=methyl, $R^{11}$=methyl and $R^{12}$=methyl.

Yield: approximately 5.9 g of the initiator 36

Analysis: FT-IR

Figure 10:
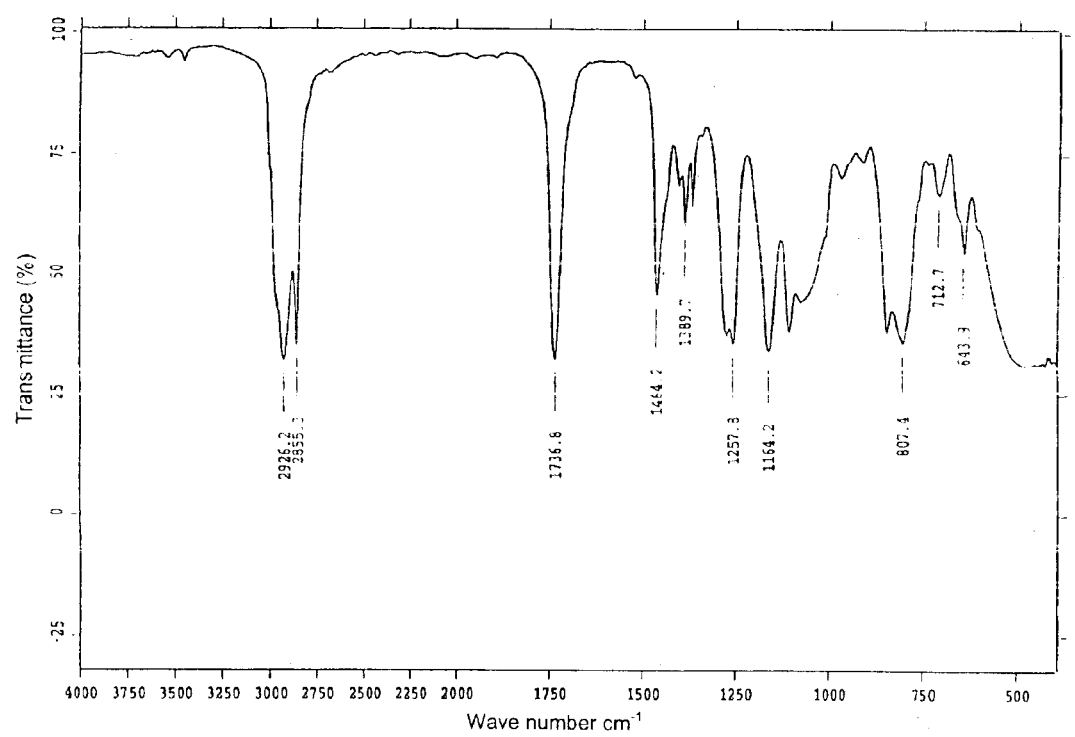
FIG. 10 shows the FT-IR spectrum of initiator (36).

FIG. 10 shows the FT-IR spectrum of initiator 36

Recording technique: transmission spectrum of 36 as film between NaCl windows.

9. Example

Initiator of the General Formula 2

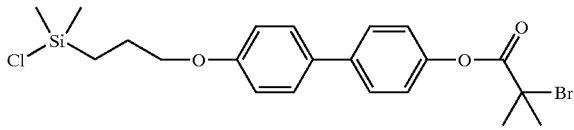

The reaction procedure and working up and isolation of the product 37 is (sic) carried out as described in Example 7. Deviating from this, 1.8 g (4.8 mmol) 2-bromo-2-methylpropionic acid 4'-allyloxybiphenyl-4-yl ester 31, 20 ml (184 mmol) chlorodimethylsilane and 15 mg hexachloroplatinic acid hexadyrate in 0.25 ml dimethoxyethane/ethanol (1/1 V/V) are employed instead of 33.

The initiator 37 corresponds to the more specific formula 16, where x=3, y=1, z=1, Z'=Br, X=Cl, $R^3$=methyl, $R^4$=methyl, $R^{11}$=methyl and $R^{12}$=methyl.

Yield: approximately 2 g of the initiator 37

10. Example

Initiator of the General Formula 2

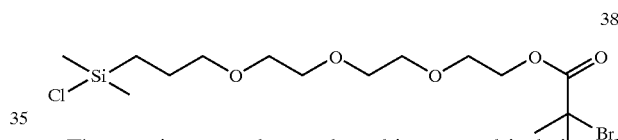

The reaction procedure and working up and isolation of the product 38 is (sic) carried out as described in Example 7. Deviating from this, 1.7 g (5 mmol) of 2-bromo-2-methylpropionic acid 2-(2-(2-allyloxyethoxy)-ethoxy)-ethyl ester 32, 20 ml (184 mmol) chlorodimethylsilane and 15 mg hexachloroplatinic acid hexadyrate in 0.25 ml dimethoxyethane/ethanol (1/1 V/V) are employed instead of 33.

The initiator 38 corresponds to the more specific formula 18, where x=3, m=3, y=1, z=1, Z'=Br, X=Cl, $R^3$=methyl, $R^4$=methyl, $R^{11}$=methyl and $R^{12}$=methyl.

Yield: approximately 1.9 g of the initiator 38

11. Example

Initiator of the General Formula 5

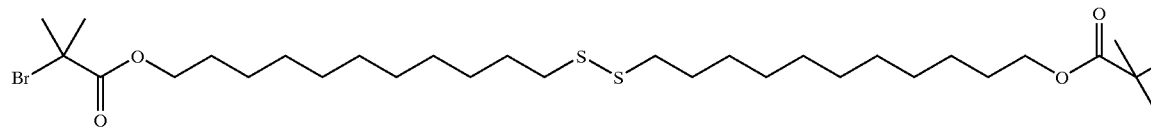

Bis(11-hydroxyundecyl)disulphide is prepared in accordance with known literature [Bain, C. B.; Troughton, E. B.; Tao, Y. T.; Evall, J.; Whitesides, G. M.; Nuzzo, R. G., J. Am. Chem. Soc. 111, 321 (1989)]. N,N-dimethylaminopyridine is used without further purification. The pretreatment of other chemicals and solvents has been described in Examples 3 and 5 above.

A solution of 3.2 ml (25.9 mmol) 2-bromo-2-methyl-propionic acid bromide 30 in 20 ml absolute THF is added dropwise under blanketing gas to a solution of 5.02 g (12.3 mmol) di-(11-hydroxyundecyl)disulphide, 3.8 ml (27.3 mmol) triethylamine and 12 mg (10 μmol) N,N-dimethylaminopyridine in 100 ml absolute THF. The solution is stirred at room temperature for a further 2 h.

The reaction solution is concentrated in a rotary evaporator and the residue is taken up in diethyl ether. The organic phase is washed with 50 ml 2N sodium hydroxide solution and three times with 50 ml distilled water. The organic phase is dried over sodium sulphate and the solvent removed under vacuum. Column filtration through aluminium oxide (neutral) with petroleum ether as eluent gives the product 39 in the form of a whitish, waxy oil. 39 corresponds to the more specific formula 24 where x=11, Z'=Br, $R^{11}$=methyl and $R^{12}$=methyl.

Yield: 7.36 g of the initiator 39

Analysis: FT-IR

Figure 11:
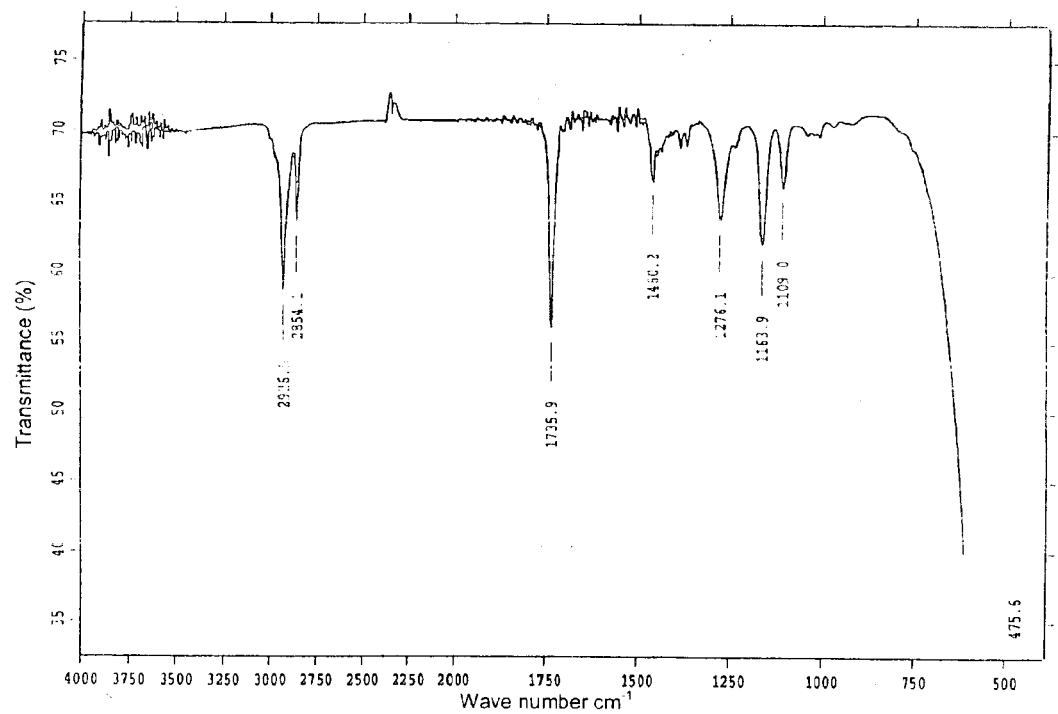
FIG. 11 shows the FT-IR spectrum of compound (39).

FIG. 11 shows the FT-IR spectrum of compound 39

Recording technique: transmission spectrum of a film of the compound 39 between NaCl windows.

Binding of Initiators to Solid Surfaces

12. Example

Initiator 30 Bound to Poly(p-hydroxystyrrene-co-divinylbenzene)

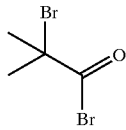

30

Poly(p-hydroxystyrene-co-divinylbenzene) is prepared in accordance with known literature [Spittel, A., Thesis, University of Hannover (1991)]. Ethanol is distilled. The pretreatment of other chemicals and solvents has been described in Examples 3 and 4 above.

5 g poly(p-hydroxystyrene-co-divinylbenzene) microgel are introduced into a baked-out round-bottomed flask and stirred in 200 ml absolute dichloromethane under blanketing gas for 24 h. 1.4 ml (17.3 mmol) pyridine are then added. The reaction mixture is cooled in an ice bath and a solution of 2 ml (16.5 mmol) 2-bromo-2-methylpropionic acid bromide 30 in 20 ml absolute dichloromethane is added slowly dropwise. When the addition is complete, the reaction mixture is heated to room temperature and stirred for a further 12 h.

The microgel coated with 30 is filtered off and washed successively with diethyl ether, ethanol, ethanol/water (1/1 V/V), ethanol and diethyl ether, using 100 ml in each case. The product is dried under vacuum (10 mbar) at 50° C.

Yield: 5.65 g microgel coated with initiator 30, corresponds to 0.87 mmol initiator 30 per g microgel

13. Example

Initiator 35 Bound to Silica Gel

Silica gel (Ultrasil 3370, Degussa) is dried for 36 h at 110° C. and 10 mbar. Toluene is dried by heating it to the boil over sodium wire with reflux cooling. It is distilled off immediately prior to use. The pretreatment of other chemicals and solvents has been described in Examples 3, 5 and 7 above.

2 ml (14.4 mmol) Triethylamine and a solution of 2 g (4.8 mmol) 2-chloro-2-phenylacetic acid 11'-(chlorodimethylsilyl)undecyl ester 35 in 5 ml absolute toluene are added to a suspension of 3 g silica gel in 200 ml absolute toluene under blanketing gas. The reaction mixture is stirred for 24 h at room temperature under blanketing gas.

For working up the silica gel is separated off from the reaction solution via a frit and is then washed in portions with toluene, ethanol/water (1/1 V/V), pH 3, ethanol/water (1/1 V/V), ethanol and diethyl ether, using 150 ml in each case. The silica gel coated with 35 is then dried to constant weight at 30° C. and 10 mbar.

Figure 12:
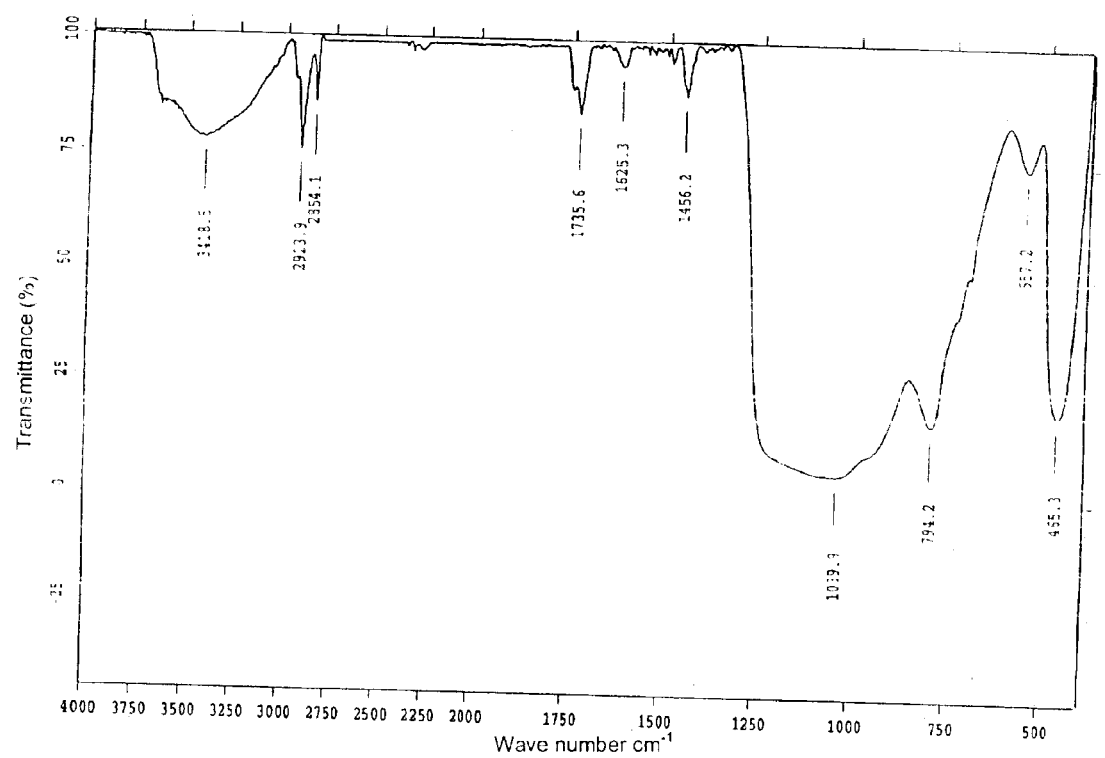
FIG. 12 shows the FT-IR spectrum of the silica gel with the initiator (35) bonded to the surface.

Yield: approximately 3.3 g of silica gel coated with 35, corresponds to 0.24 mmol initiator 35 per g silica gel Analysis: FT-IR FIG. 12 shows the FT-IR spectrum of the silica gel with initiator 35 bound to the surface.

Recording technique: transmission measurement of a film that has been produced by vaporisation of a suspending agent on a KBr compact.

14. Example

Initiator 36 Bound to Silica Gel

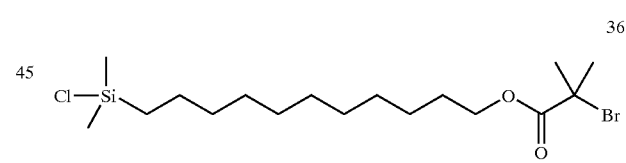

The procedure and working up steps for binding initiator to solids have been described in Example 13.

Deviating from Example 13, 5 g of silica gel are suspended in 300 ml toluene and 3.6 ml (25 mmol) triethylamine and, instead of initiator 35, 2-bromo-2-methylpropionic acid 11'-(chlorodimethylsilyl)undecyl ester 36 in 10 ml absolute toluene are used. For working up, instead of 150 ml in each case 200 ml in each case of toluene, ethanol/water (1/1 V/V), pH 3, ethanol/water (1/1 V/V), ethanol and diethyl ether are used.

Yield: approximately 5.5 g silica gel coated with 36, corresponds to 0.27 mmol initiator 36 per g silica gel.

Analysis: FT-IR

Figure 13:
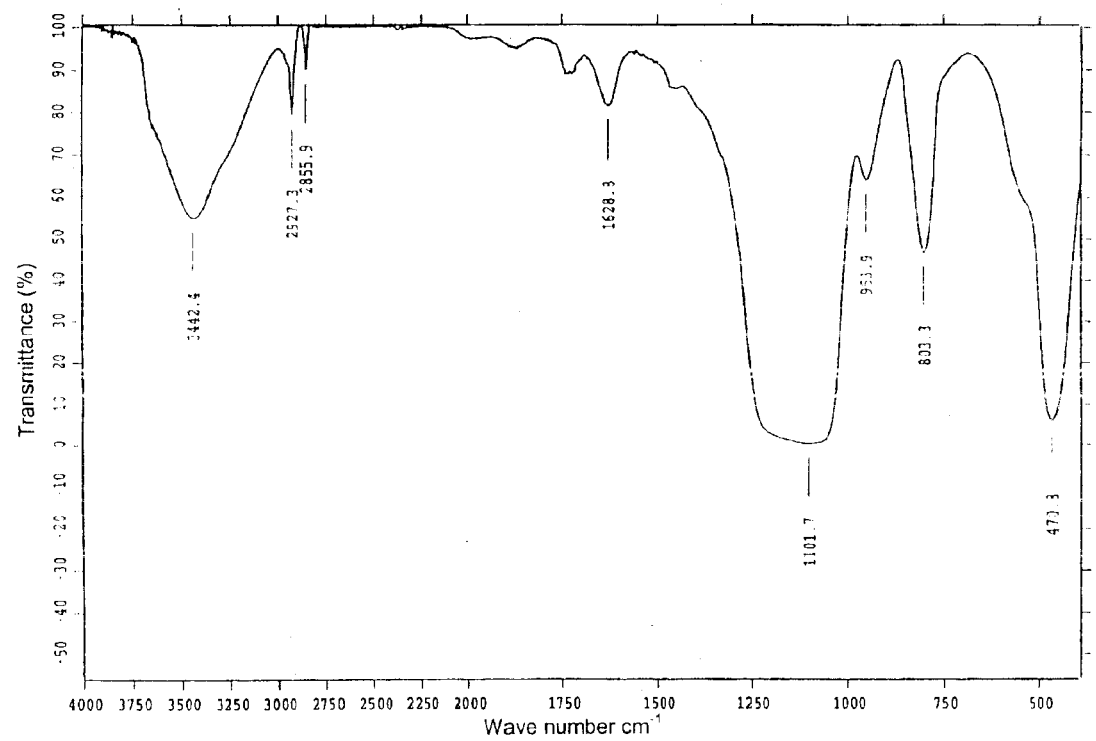
FIG. 13 shows the FT-IR spectrum of the silica gel with the initiator (36) bonded to the surface of the silica gel.

FIG. 13 shows the FT-IR spectrum of the silica gel with initiator 36 bound to the surface.

Recording technique: transmission measurement of a film that has been produced by vaporisation of a suspending agent on a KBr compact.

15. Example

Initiator 36 Bound to Glass Beads

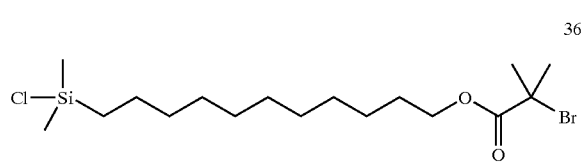

36

In order to increase the number of reactive silanol groups on the surface of the glass beads (170 mesh), 3 g of glass beads are etched for 4h in 40 ml 4N sodium hydroxide solution at the boil. The glass beads are filtered off over a glass frit and washed with approximately 250 ml distilled water until neutral. The glass beads are dried for 36 h under vacuum (10 mbar) at a temperature of 80° C. The procedure and working up steps for binding initiator to the solid is (sic) carried out analogously to Example 13.

2 g of the glass beads are suspended in 50 ml absolute toluene under blanketing gas in a baked-out round-bottomed flask. 1.3 ml (9.4 mmol) triethylamine and 3.92 g (9.5 mmol) of the initiator 36 are added to this suspension. The reaction is carried out for 18 h at room temperature under blanketing gas.

The glass beads are separated off from the reaction solution and washed successively with toluene, ethanol/water (1/1 V/V), pH 3, ethanol/water (1/1 V/V), ethanol and diethyl ether using 70 ml in each case. The product is dried for 48 h at room temperature under vacuum (10 mbar).

Analysis: FT-IR

Figure 14:
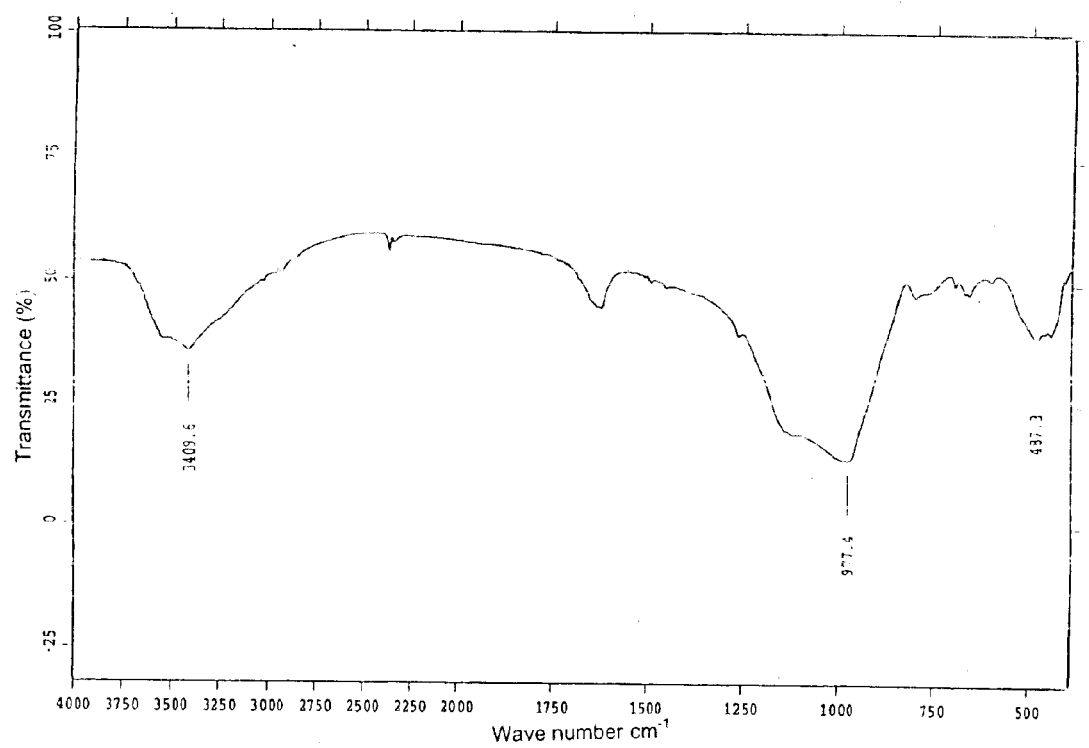
FIG. 14 shows the FT-IR spectrum of the glass beads with the initiator (36) bonded to the surface.

FIG. 14 shows the FT-IR spectrum of the glass beads with initiator 36 bound to the surface.

Recording technique: transmission spectrum of a KBr compact.

16. Example

Initiator 39 Bound to Colloidal Gold

Colloidal gold in toluene is prepared in accordance with known literature [Burst, M.; Bethell, D.; Kiely, C. J.; Schiffrin, D. J, Adv. Mater., 7, 795 (1995)]. Didodecyl disulphide is prepared on the basis of a method in the literature [Bain, C. B.; Troughton, E. B.; Tao, Y. T.; Evall, J.; Whitesides, G. M.; Nuzzo, R. G., J. Am. Chem. Soc. 111, 321 (1989)].

A solution of 135 mg (0.336 mmol) didodecyl disulphide and 60 mg (0.085 mmol) of the initiator 39 in 80 ml distilled toluene is added slowly to a dispersion of 178 mg (0.9 mmol) colloidal gold (particle diameter approximately 8 nm) in 750 ml distilled toluene and the mixture is stirred at room temperature for a further 3 h.

The organic phase is concentrated to dryness under vacuum. The residue is washed intensively with ethanol and acetone. The product is then re-dispersed in toluene and again concentrated to dryness and the residue is again washed with ethanol and acetone. This procedure is carried out three times in total.

Yield: 0.205 g colloidal gold coated with 39

Analysis: FT-IR

Figure 15:
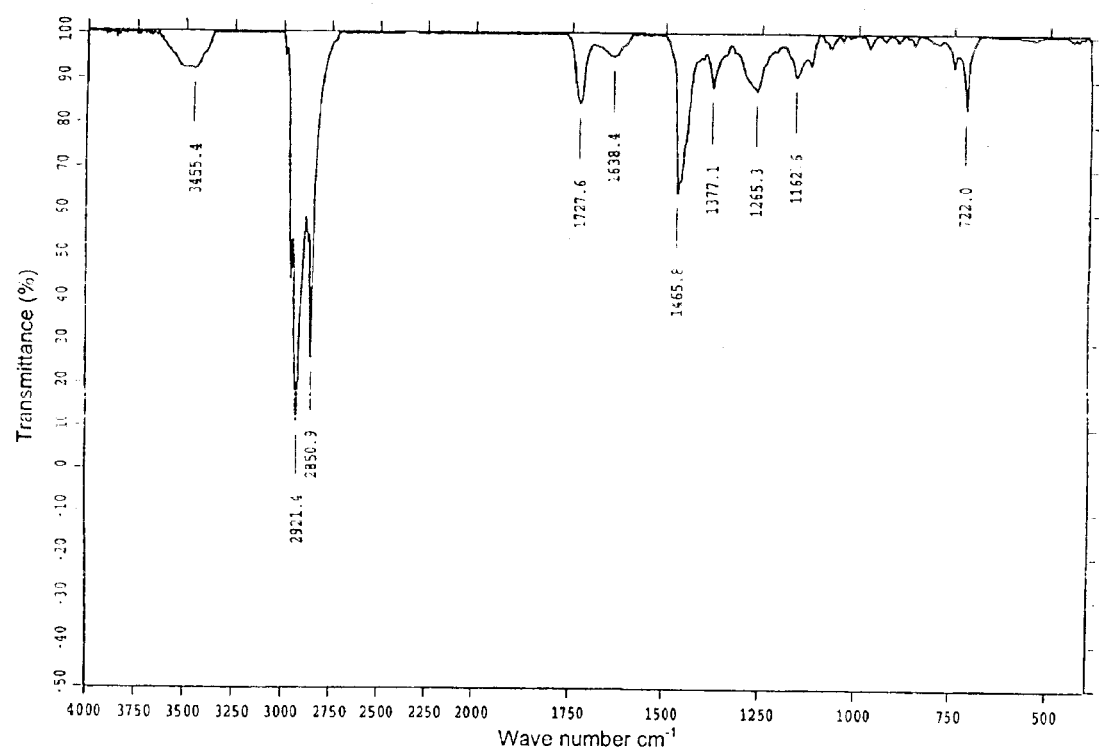
FIG. 15 shows the FT-IR spectrum of the gold colloid with initiator (39) bonded to the surface.

FIG. 15 shows the FT-IR spectrum of the gold colloid with initiator 39 bound to the surface.

Recording technique: transmission spectrum of a KBr compact.

17. Example

Variation of the Concentration of the Initiator 35 on the Silica Gel Surface The procedure and working up steps for binding initiator to the solid have been described in Example 13. Deviating from Example 13, the ratios of initiator 35 to silica gel that are employed are varied (see Table 1). The ratio of initiator 35 to absolute triethylamine is 1 eq. to 3 eq. in all experiments.

TABLE 1

Batch ratio of initiator 35 to silica gel and the resulting surface concentration of 35 on the silica gel

| Experiment | 35/silica gel (mmol/g) [a] | [35] (mmol/g) [b] |
|---|---|---|
| 1 | 0.27 | 0.14 |
| 2 | 0.73 | 0.28 |
| 3 | 1.78 | 0.30 |

[a] ratio of initiator 35 to silica gel in the reaction mixture
[b] concentration of initiator 35 on the silica gel surface in the product, determined by TGA Yield: see Table 1, last column Analysis: TGA

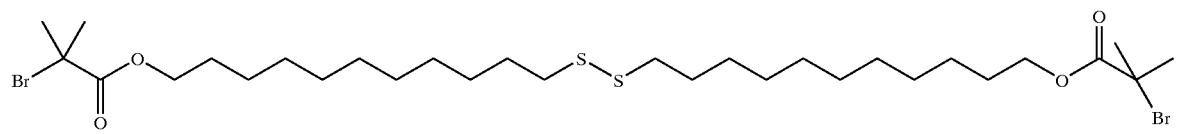

39

Figure 16:
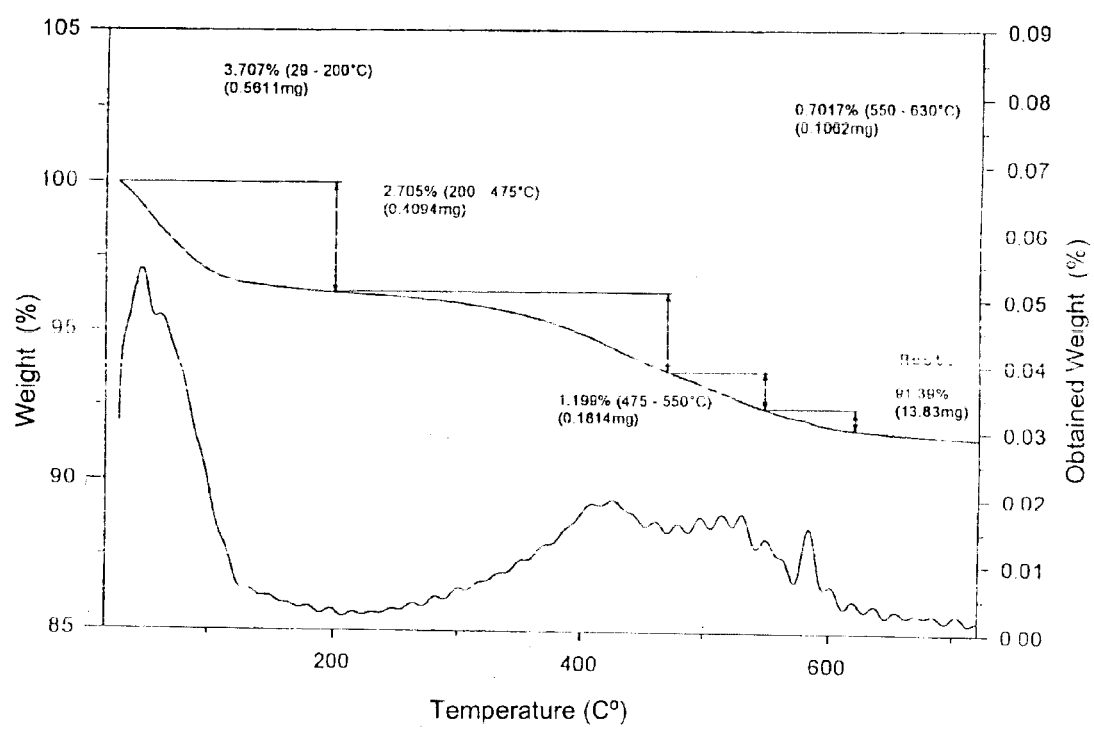
FIGS. 16–18 show the diagram of the thermogravimetric analysis of the Samples 1–3.
Figure 17:
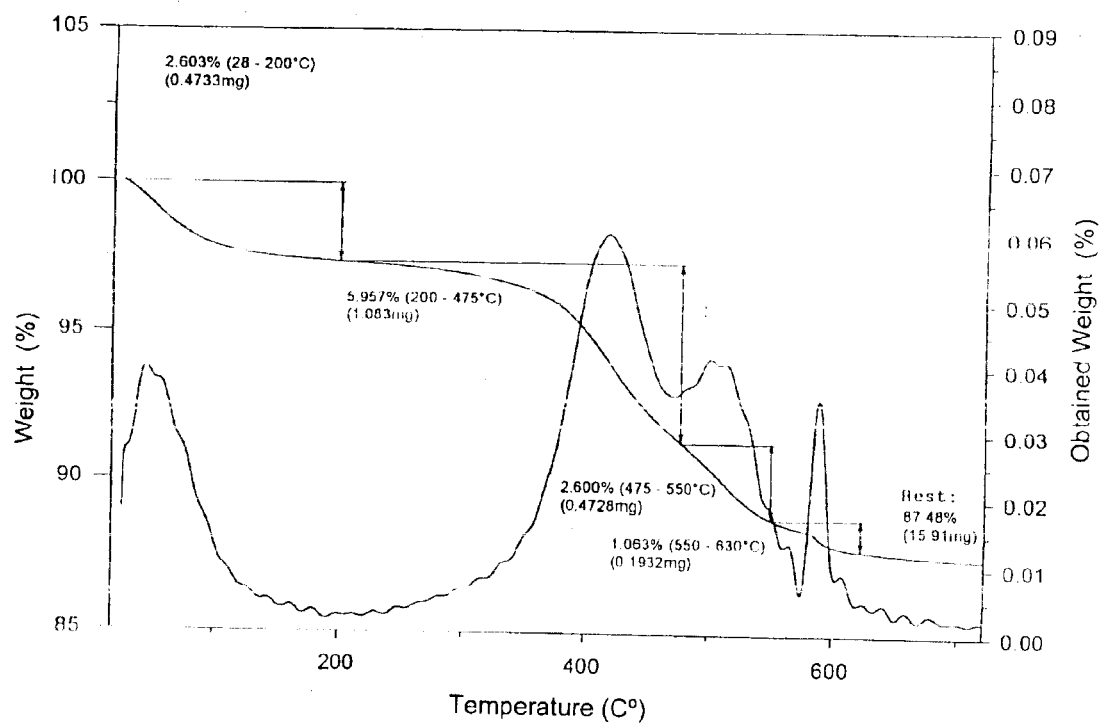
Figure 18:
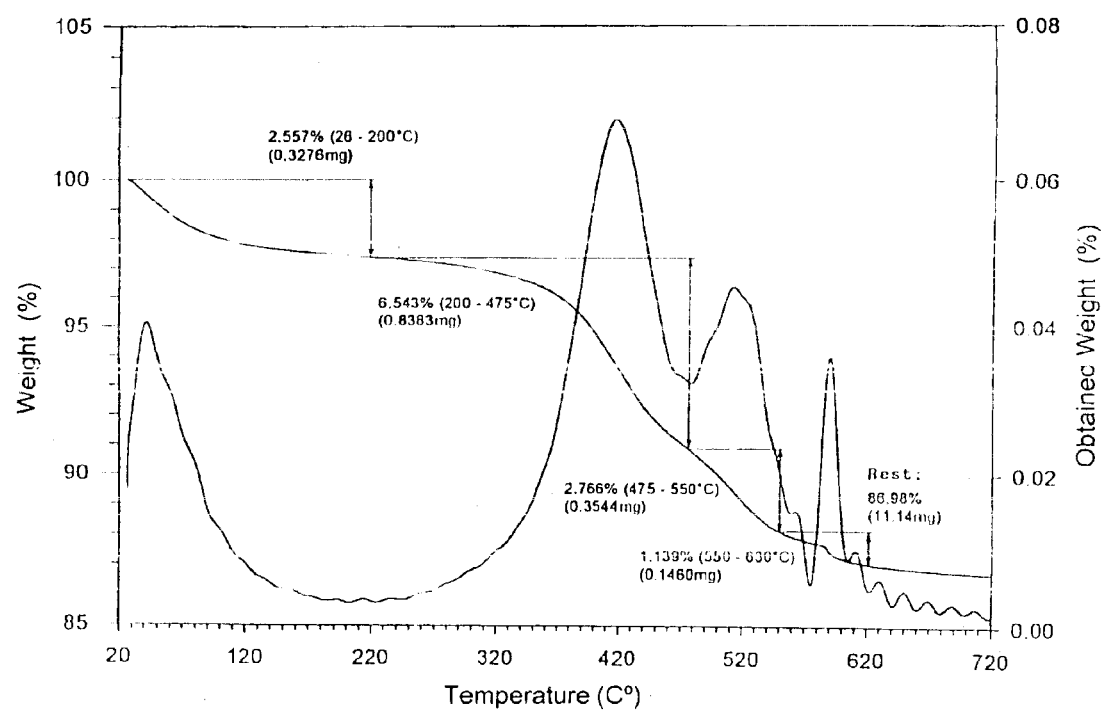

FIGS. 16–18 show the plots of the thermogravimetric analysis for experiments 1–3.

Analytical conditions: heating under a nitrogen atmosphere from 30° C. to 550° C., then under an air atmosphere from 550° C. to 750° C., heating rate=20° C. per min. The loss in weight of the sample is detected during these analyses.

Polymerisation with the Initiators

18. Example

Solution Polymerisation of Methyl Methacrylate at 60° C. in Toluene with the Initiator 39

Methyl methacrylate is dried over $CaH_2$, distilled under reduced pressure, flushed with argon and stored at –20° C. CuBr is washed with concentrated acetic acid, water and ethanol. N-(n-butyl)-2-pyridylmethaneimine is prepared in accordance with known literature [Haddleton, D. M.; Jasieczek, C. B.; Hannon, M. J.; Shooter, A. J., Macromolecules 30, 2190 (1997)]. The pretreatment of other chemicals and solvents has been described in Examples 3 and 13 above.

10 ml (94 mmol) Methyl methacrylate, 10 ml absolute toluene, 135 mg (0.94 mmol) CuBr and 305 mg (1.9 mmol) N-(n-Butyl)-2-pyridylmethaneimine are introduced into a Schlenk flask, then degassed three times under vacuum, the vacuum in each case being broken with nitrogen. 664 mg (0.94 mmol) of the initiator 39 are then added in nitrogen counter-current. The reaction vessel is closed with a septum and the reaction mixture is rapidly heated in an oil bath preheated to 60° C. and kept at this temperature for 24 h.

At the end of this period the polymer is filtered through a small column filled with aluminium oxide (neutral). Distilled THF serves as eluent. After concentrating the solution under vacuum the polymer is precipitated in distilled petroleum ether.

Yield: 7.8 g poly(methyl methacrylate)

Analysis: GPC

Figure 19:
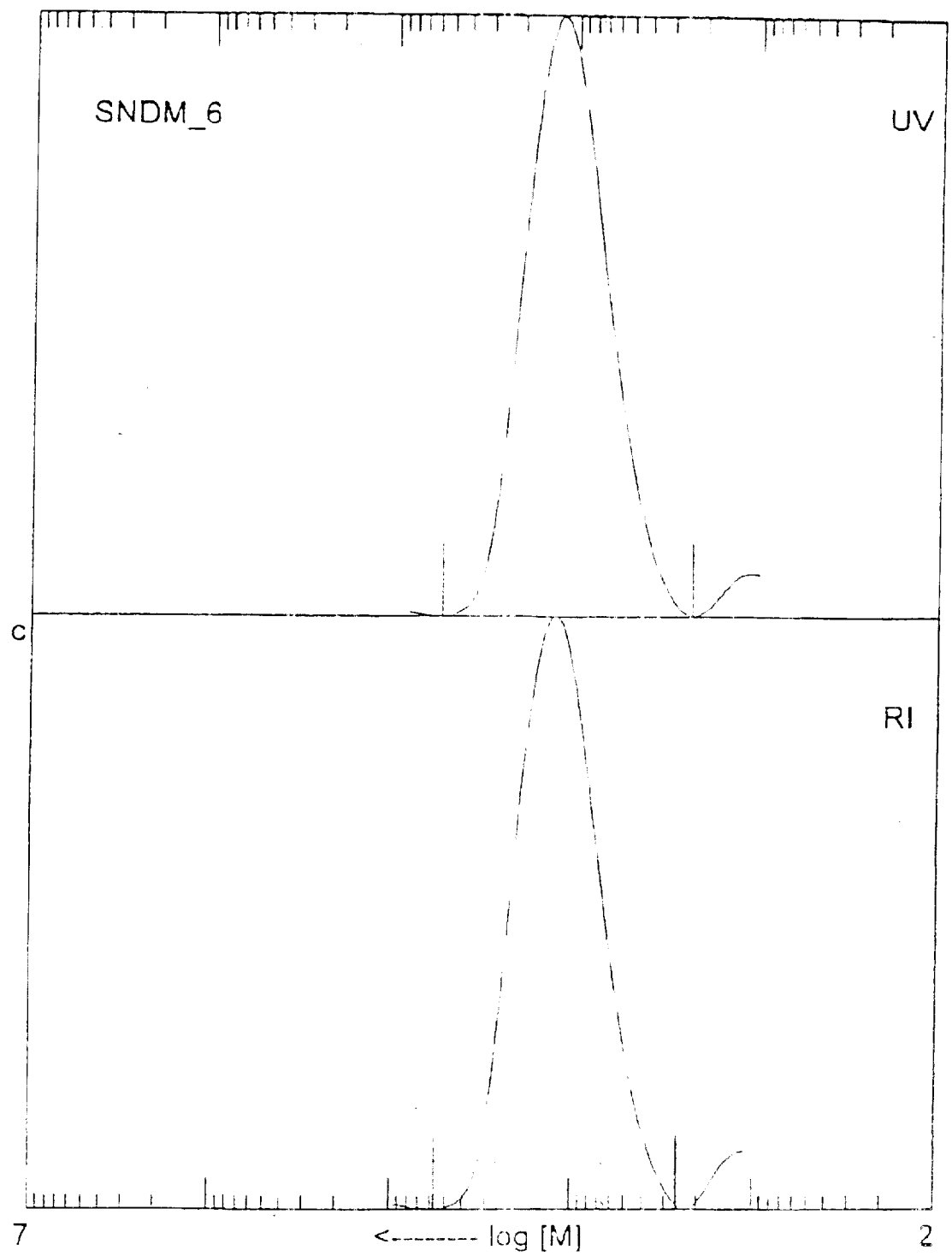
FIG. 19 shows the GPC-chromatogram of the poly (methyl-methacrylate).

FIG. 19 shows the GPC chromatogram of the poly(methyl methacrylate).

Chromatrography conditions: eluent: THF, detection: UV and RI, calibration: poly(styrene) standards.

From UV: Mw=12657, Mn=10020, U=0.26; from RI: Mw=13116; Mn=10335, U=0.27.

19. Example

Polymerisation of Methyl Methacrylate at 60° C. with Initiator 30 Bound to Microgel The pretreatment of other chemicals and solvents is carried out in accordance with Example 18.

1.13 g of the microgel coated with initiator 30 from Example 12 are suspended in 10 ml (94 mmol) methyl methacrylate and 10 ml absolute toluene in a baked-out Schlenk flask. 490 mg (3 mmol) N-(n-butyl)-2-pyridylmethaneimine are added to this suspension and the suspension is flushed with argon for 10 min. 148 mg (1 mmol) CuBr are then added in weak counter-current of blanketing gas and the reaction vessel is closed with a septum. The polymerisation is carried out for 24 h at 60° C.

The batch is cooled in an ice bath and diluted with THF. The microgel is separated off and extracted with THF in a Soxhlet extractor for 24 h. The product is dried to constant weight under vacuum (10 mbar) at 50° C.

Yield: 6.83 g microgel grafted with poly(methylmethacrylate)

20. Example

Polymerisation of tert-butyl Acrylate with Initiator 30 Bound to Microgel

Diphenyl ether is washed with concentrated $H_2SO_4$ and water, dried over $CaCl_2$ and distilled under reduced pressure. 4,4'-diheptyl-2,2'-bipyridine is prepared in accordance with known literature [Leduc, M. R.; Hawker, C. J.; Dao, J.; Frechet, J. M. J., J. Am. Chem. Soc., 118, 11111 (1996)]. Tert-butyl acrylate is dried over $CaCl_2$ and distilled under vacuum, then stored under blanketing gas at 0° C. The pretreatment of other chemicals and solvents is carried out in accordance with Example 18.

1.13 g of the microgel coated with initiator 30 from Example 12 are suspended in 10 ml (68.9 mmol) tert-butyl acrylate and 10 ml diphenyl ether in a baked-out Schlenk flask. 704 mg (2 mmol) 4,4'-diheptyl-2,2'-bipyridine are added to this suspension and the suspension is flushed with argon for 10 min. 150 mg (1 mmol) CuBr are then added in a weak counter-current of blanketing gas and the reaction vessel is closed with a septum. The polymerisation is carried out for 12 h at 90° C.

The batch is cooled in an ice bath and diluted with THF. The microgel is separated off and extracted for 24 h with THF in a Soxhlet extractor. The product is dried to constant weight under vacuum (10 mbar) at 50° C.

Yield: 3.34 g microgel grafted with poly(tert-butyl acrylate).

21. Example

Polymerisation of Styrene at 120° C. with Initiator 35 Bound to Silica Gel

Styrene is dried over $CaH_2$, distilled under reduced pressure, flushed with argon and stored at –20° C. CuCl is washed with 5N HCl, water and ethanol. 2,2'-bipyridine is recrystallised from distilled petroleum ether. Methanol is distilled. (±)-propylene carbonate is used without further purification.

1.1 g of the silica gel coated with 35 from Example 13, 150 mg CuCl (1.5 mmol, 480 mg bipyridine (3.1 mmol), 8 ml styrene (70 mmol) and 8 ml (±)-propylene carbonate are placed in a baked-out Schlenk flask. The reaction batch is freed from oxygen by repeated evacuation and breaking of the vacuum with argon. The polymerisation takes place under blanketing gas and with intensive stirring for 24 h at a temperature of 120° C.

After a given time the batch is cooled in an ice bath in order to terminate the reaction. The suspension is transferred to centrifuge tubes and the silica gel, which is now coated with poly(styrene), is centrifuged off. In the centrifuge tubes the silica gel is washed several times with toluene and then with methanol. In order to free the solid from Cu salts that are still adhering, the silica gel is suspended in chloroform in a conical flask and water is poured onto this suspension. This mixture is stirred vigourously and the aqueous phase is replaced until the aqueous phase no longer has a discernible blue colour. The organic phase is separated from the aqueous phase. The organic suspending agent is then substantially removed under vacuum.

Finally, the product is dried to constant weight at 60° C. and 10 mbar.

Figure 20:
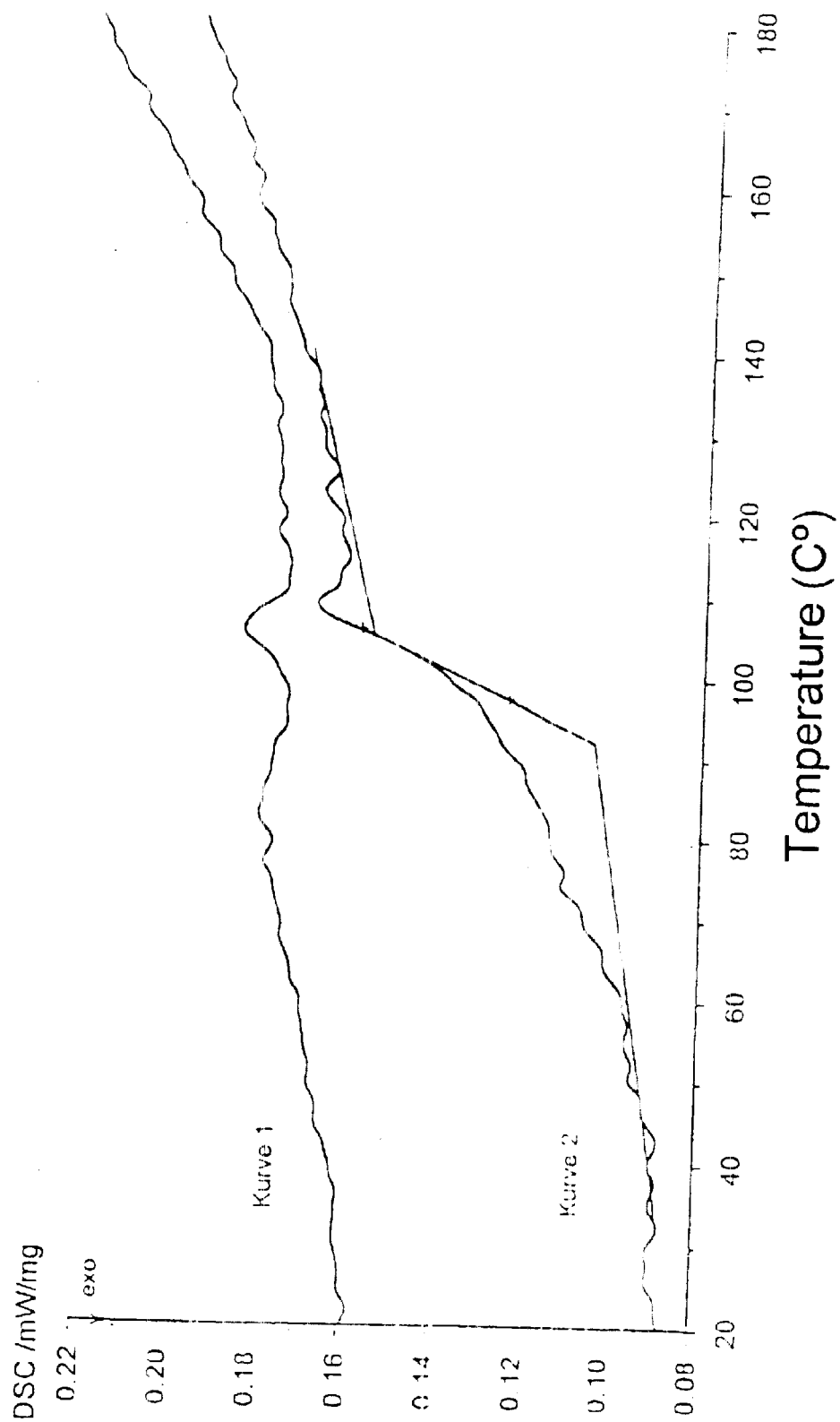
FIG. 20 shows the DSC-curve of the poly(styrene) of first generation on the silica gel surface.

Yield: 2.25 g of silica gel grafted with poly(styrene), corresponds to approximately 1.25 g poly(styrene) per g silica gel Analyses: DSC, FT-IR FIG. 20 shows the DSC plot of the first generation poly(styrene) on the silica gel surface.

Plot 1 is the DSC-signal that is obtained on first heating. Plot 2 is the DSC-signal that is obtained on second heating, after programmed cooling following the first heating. The glass transition step of poly(styrene) in the range between approximately 100° C. and 110° C. is seen in plot 2.

Figure 21:
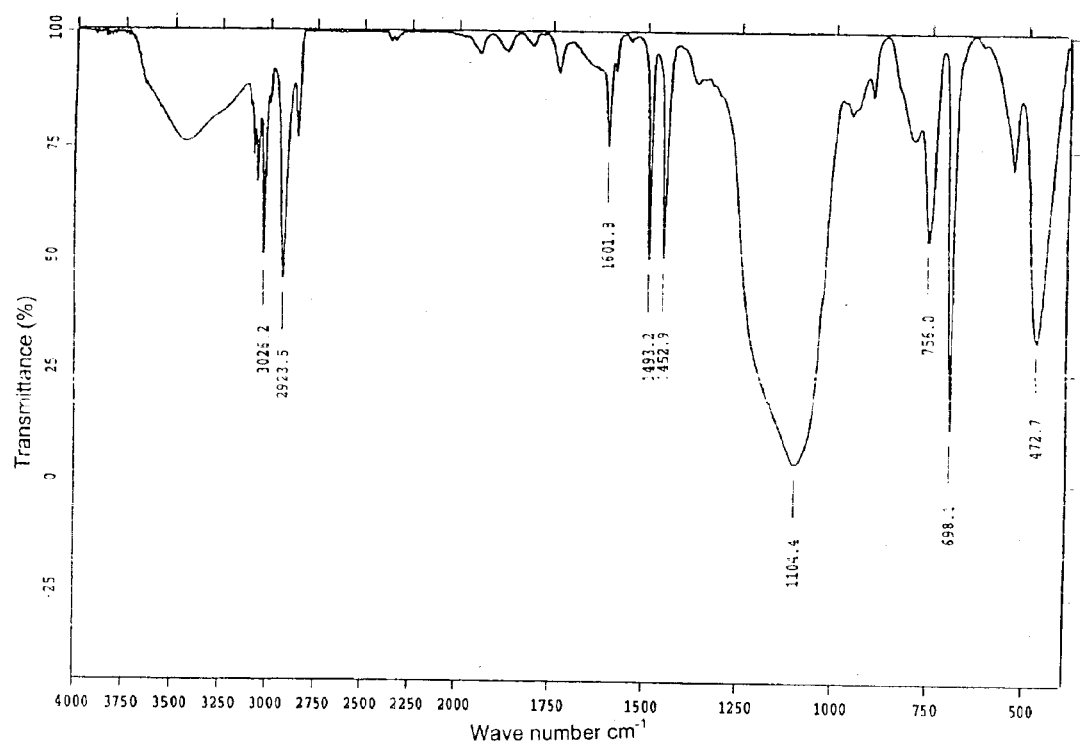
FIG. 21 shows the FT-IR spectrum of the poly(styrene) of first generation on the silica gel surface.

FIG. 21 shows the FT-IR spectrum of the first generation poly(styrene) on the silica gel surface.

Recording technique: transmission spectrum of a cast film.

22. Example

Polymerisation of Styrene at 90° C. with Initiator 35 Bound to Silica Gel

The reaction is carried out analogously to Example 21 described above, but the reaction temperature is set at 90° C. Working-up of the silica gel grafted with poly(styrene) takes place in the same way.

Yield: 820 mg polystyrene per g silica gel

Analysis: TGA

Figure 22:
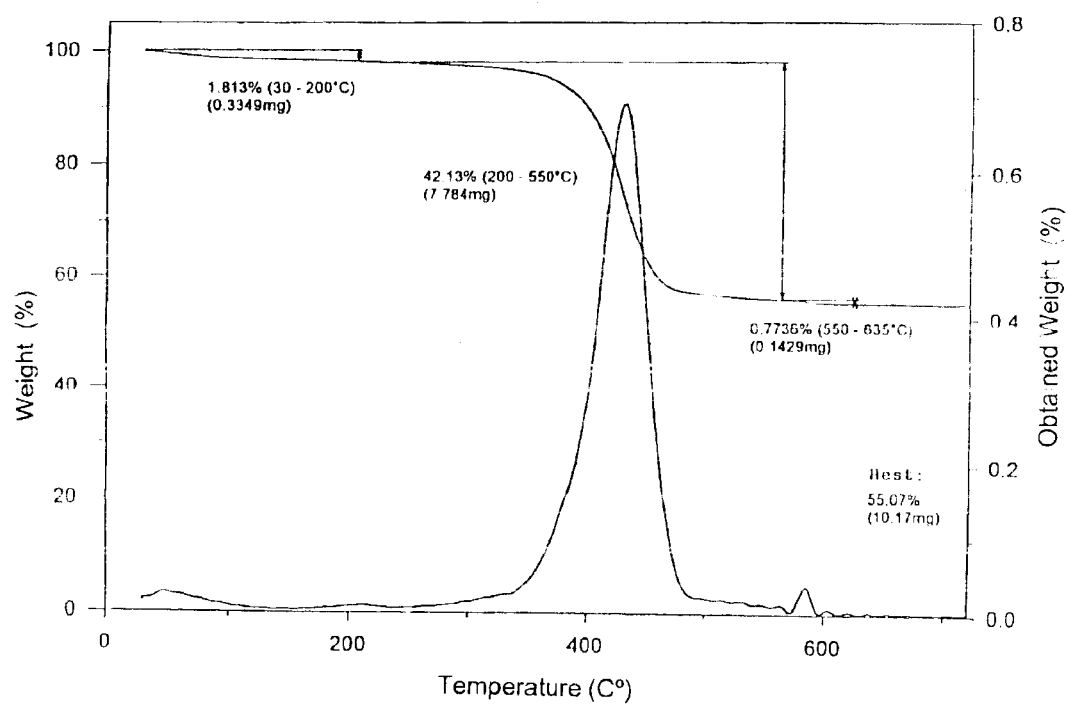
FIG. 22 shows the diagram of the thermogravimetric analysis of the poly(styrene) grafted silica gel.

FIG. 22 shows the plot of the thermogravimetric analysis of the silica gel grafted with poly(styrene).

Analytical conditions: heating under a nitrogen atmosphere from 30° C. to 550° C., then under an air atmosphere from 550° C. to 750° C., heating rate=20° C./min. The loss in weight of the sample is detected in this analysis.

23. Example

Polymerisation of Isoprene with Initiator 35 Bound to Silica Gel

Isoprene is washed with dilute sodium hydroxide solution and water and dried over $CaH_2$. It is distilled under blanketing gas and stored under blanketing gas at −20° C. The pretreatment of other chemicals and solvents has been described in Examples 13 and 21 above.

250 mg of silica gel coated with 35 is placed in a screw-cap test tube provided with a magnetic stirrer, with ice cooling. 10 ml (100 mmol) isoprene and 312 mg (2 mmol) 2,2'-bipyridine are added. The reaction mixture is flushed with argon in order to remove oxygen. 102 mg (1.02 mmol) CuCl are then added in a weak stream of blanketing gas and the reaction vessel is tightly closed. The reaction mixture is then heated for 14 h at 130° C. under blanketing gas.

The reaction (sic) is cooled in an ice bath and the suspension is transferred to a round-bottomed flask. 20 ml toluene are added to this suspension and the excess isoprene is removed under vacuum. The silica gel coated with poly(isoprene) is separated off by centrifuging and extracted several times with toluene. The product is dried to constant weight at room temperature under vacuum (10 mbar).

Figure 23:
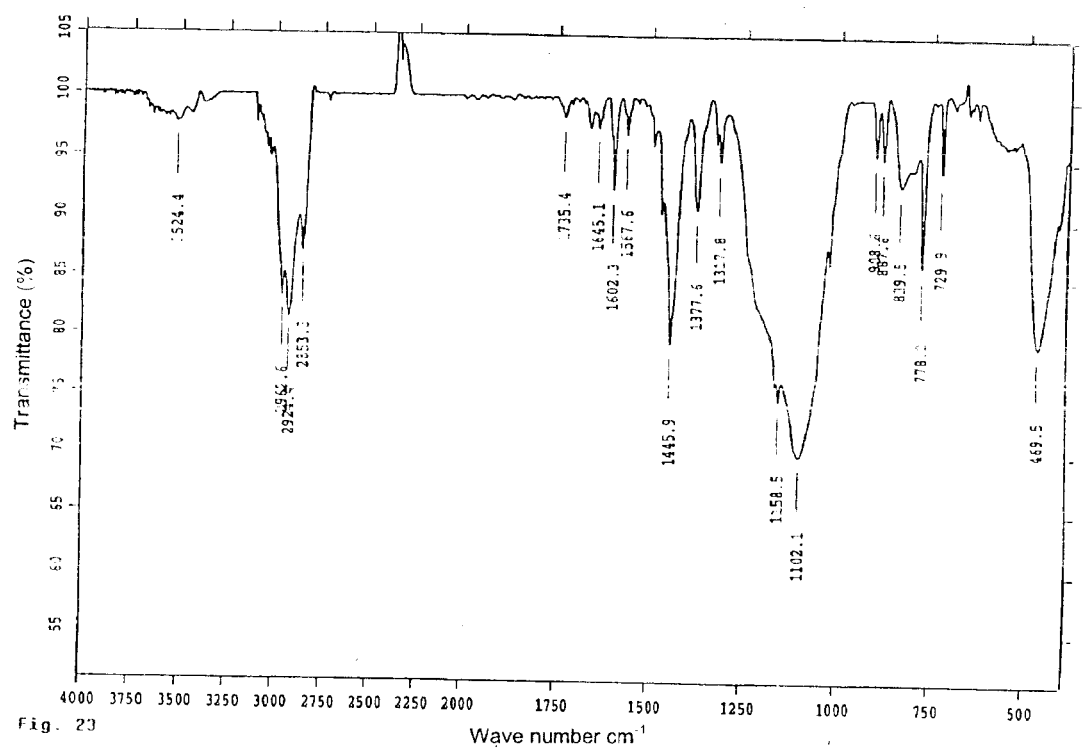
FIG. 23 shows the FT-IR spectrum of the poly(isoprene) coated silica gel.

Yield: 1.5 g silica gel grafted with poly(isoprene), corresponds to 5 g poly(isoprene) per g silica gel Analyses: FT-IR, DSC FIG. 23 shows the FT-IR spectrum of the silica gel coated with poly(isoprene).

Recording technique: transmission spectrum of a KBr compact.

Figure 24:
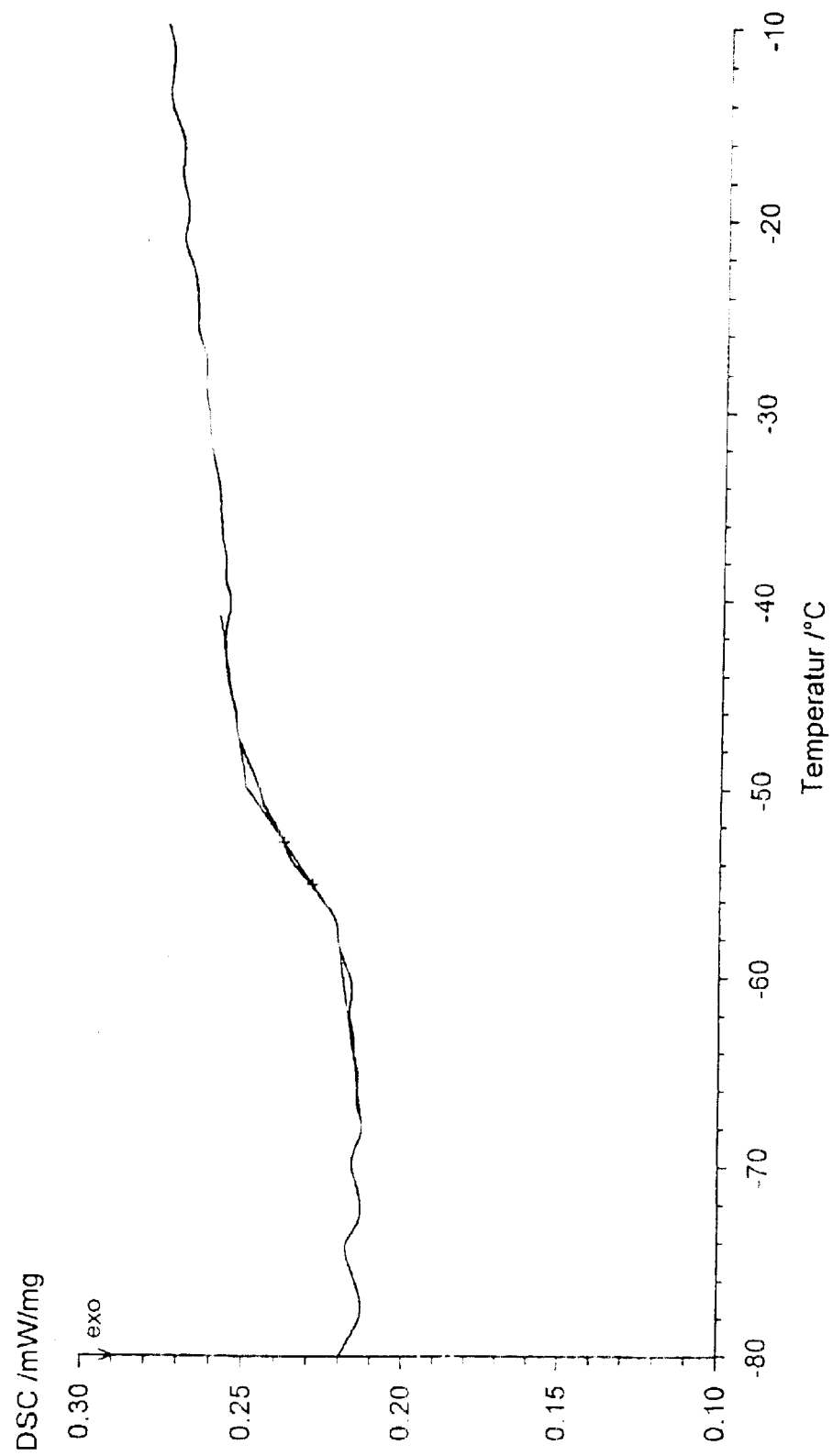
FIG. 24 shows the DSC-curve of the silica gel covered with poly(isoprene).

FIG. 24 shows the DSC plot of the silica gel coated with poly(isoprene).

The glass transition step of the poly(isoprene) between −57° C. and −50° C. is seen in the DSC plot.

24. Example

Polymerisation of Methyl Methacrylate with Initiator 36 Bound to Silica Gel The pretreatment of the chemicals and solvents used has been described in Examples 18 and 20 above.

300 mg of silica gel coated with 36 from Example 14, 4 ml (37 mmol) methyl methacrylate, 4 ml diphenyl ether and 71 mg (0.2 mmol) 4,4'-diheptyl-2,2'-bipyridine are placed in a baked-out Schlenk flask. The solution is flushed with argon for 10 minutes. 14 mg (0.1 mmol) CuBr are then added to the reaction mixture, the mixture is again flushed with argon and the reaction vessel is closed with a septum. The reaction batch is heated in an oil bath for 18 h at 90° C. under blanketing gas.

After cooling the batch in an ice bath, the reaction mixture is diluted with THF and the coated silica gel is separated off by centrifuging. The silica gel is extracted with THF in a Soxhlet extractor.

Yield: 2.49 g silica gel grafted with poly(methyl methacrylate), corresponds to 7.3 g poly(methyl methacrylate) per g silica gel

25. Example

Polymerisation of Methyl Methacrylate with Initiator 36 Bound to Glass Beads The pretreatment of the chemicals and solvents used has been described in Example 18 above.

1 g of the glass beads coated with 36 from Example 15 are introduced into a baked-out round-bottomed flask. 2 g (20 mmol) methyl methacrylate, 2.5 ml absolute toluene, 30 mg (0.2 mmol) CuBr and 70 mg (0.43 mmol) N-(n-butyl)2-pyridylmethaneimine are added. The reaction mixture is flushed with argon for 10 min. The reaction vessel is closed with a septum and polymerisation is carried out for 18 h at 90° C.

After the reaction, the supernatant solution is removed and the coated glass beads are washed several times with 20 ml THF in each case. The product is then extracted again with THF for 48 h in a Soxhlet extractor.

Figure 25:
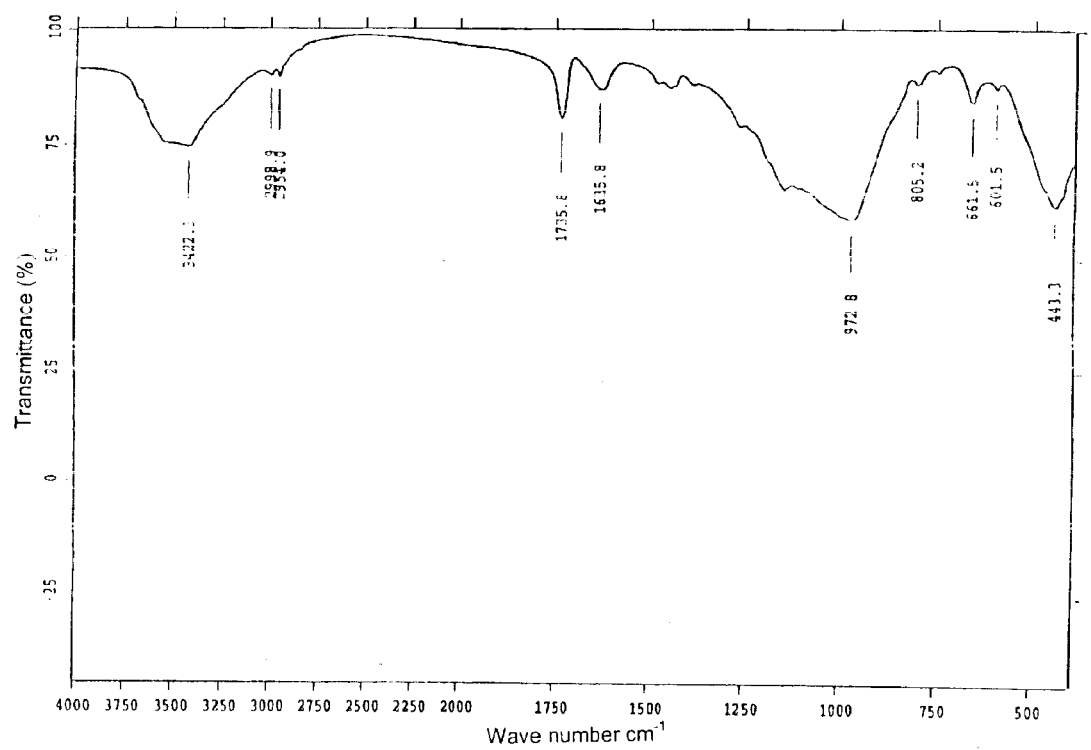
FIG. 25 shows the FT-IR-Spectrum of the glass beads covered with poly(methylmethacrylate).

Yield: 1.04 g of glass beads grafted with poly(methyl methacrylate), corresponds to 0.04 g poly(methyl methacrylate) per g glass beads Analysis FT-IR FIG. 25 shows the FT-IR-spectrum of the glass beads coated with poly(methyl methacrylate).

Recording technique: transmission measurement of a KBr compact

Production of a Second Polymer Generation

26. Example

Formation of a Second Generation Poly(styrene) Layer on the Silica Gel Surface

The pre-treatment of the chemicals and solvents used has been described in Example 21 above.

1 g of the poly(styrene)-silica gel prepared in Example 21, 150 mg CuCl (1.5 mmol), 470 mg bipyridine (3 mmol), 10 ml styrene (87 mmol) and 10 ml (±)-propylene carbonate are placed in a baked-out Schlenk tube. The reaction batch is freed from oxygen by repeated evacuation and breaking the vacuum with argon. The polymerisation takes place under blanketing gas and with intensive stirring for 36 h at a temperature of 120° C.

The reaction is terminated by cooling in an ice bath. The silica gel coated with a second poly(styrene) layer is separated from the reaction solution by centrifuging and washed several times with toluene and methanol. In order to remove Cu salts that are still adhering, the poly(styrene)-silica gel is suspended in chloroform and covered with a layer of water and the aqueous phase is replaced until the aqueous phase no longer has a discernible blue colour. The poly(styrene)-silica gel is then filtered off from the organic phase and extracted with toluene for 12 h in a Soxhlet extractor.

Finally, the product is dried to constant weight at 60° C. and 10 mbar.

Figure 26:
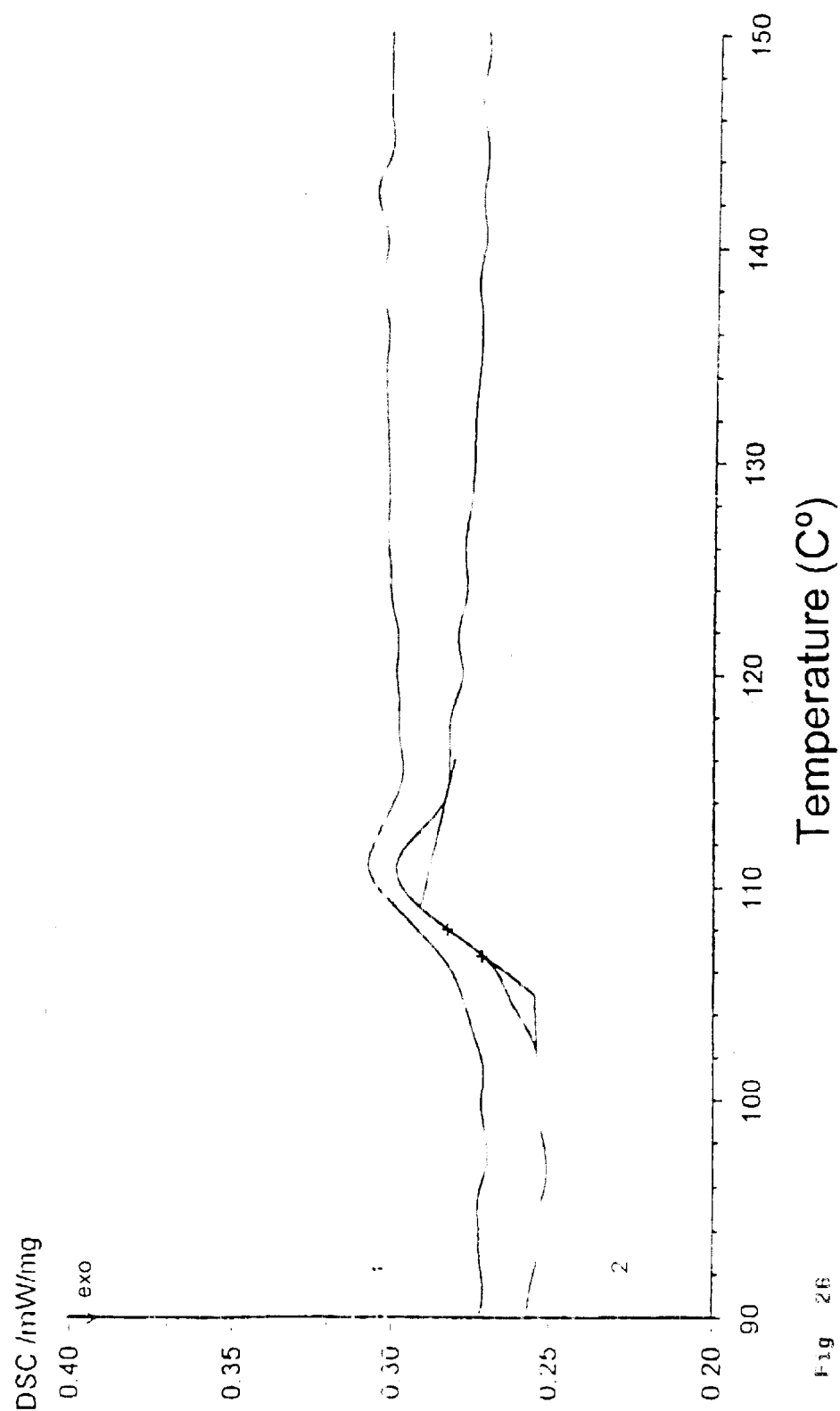
FIG. 26 shows the DSC-curve of the poly(styrene) formed in first and second generation on the silica gel surface.

Yield: 2.14 g of second generation silica gel grafted with poly(styrene), corresponds to approximately 3.75 g poly(styrene) per g silica gel Analyses: DSC, FT-IR FIG. 26 shows the DSC plots of the poly(styrene) formed in the first and second generation on the silica gel surface.

Plot 1 and plot 2 are the heating curves obtained sequentially, programmed cooling having been carried out following the first heating. The glass transition step of poly(styrene) in the range between 105° C. and 110° C. can be seen in both plots.

Figure 27:
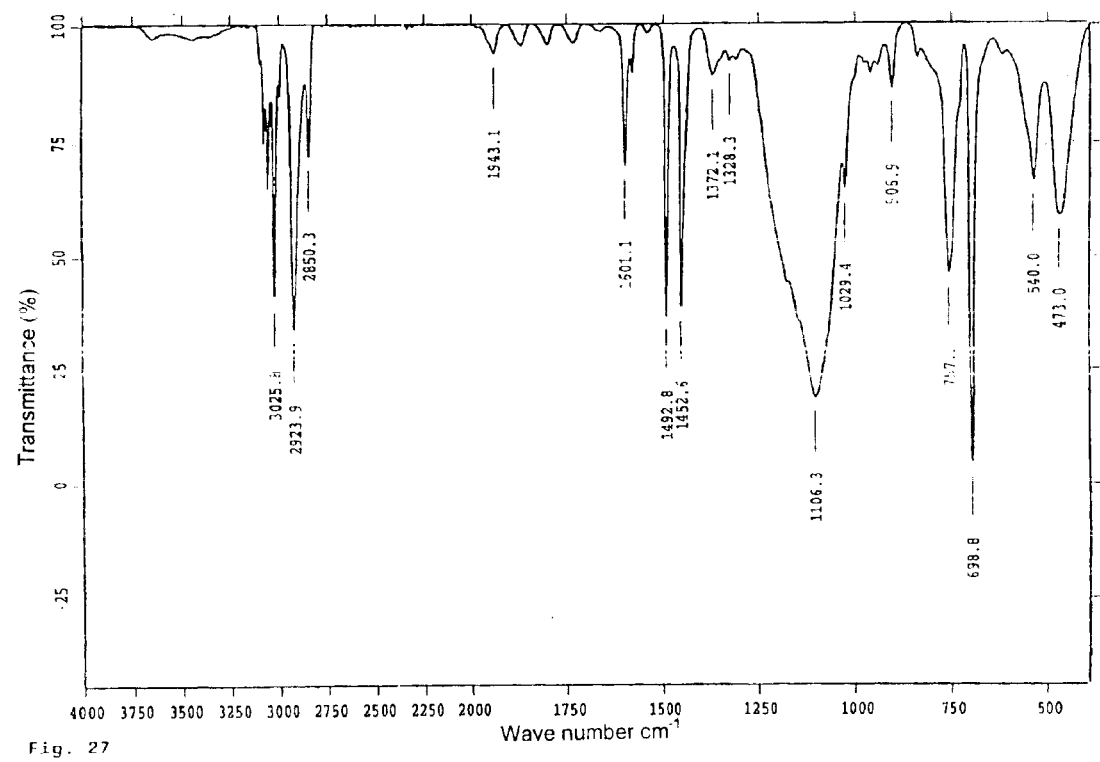
FIG. 27 shows the FT-IR spectrum of the poly(styrene) forming the first and second generation on the silica gel surface.

FIG. 27 shows the FT-IR spectrum of the poly(styrene) formed in the first and second generation on the silica gel surface.

Recording technique: transmission spectrum of a cast film

27. Example

Formation of Poly(styrene-block-p-tert.-butylstyrene) on the Silica Gel Surface p-Tert.-butylstyrene is dried over $CaH_2$ and distilled under reduced pressure under blanketing gas and then stored under blanketing gas at −20° C. The pretreatment of further chemicals and solvents used has been described in Examples 20 and 21 above.

72 mg (0.73 mmol) CuCl and 530 mg (1.5 mmol) 4,4'-diheptyl-2,2'-bipyridine are added to a suspension of 0.505 g of silica gel coated with poly(styrene) in 6.4 ml diphenyl ether and 6.4 ml (35 mmol) p-tert.-butylstyrene in a baked-out Schlenk flask. The reaction mixture is flushed with argon for 10 min and the polymerisation is then carried out for 24 h at 130° C.

The reaction is terminated by cooling in an ice bath. After diluting the reaction mixture with toluene, the silica gel coated with poly(styrene-block-p-tert.-butylstyrene) is separated from the reaction solution by centrifuging. The solid is washed several times with toluene and finally with methanol. In order to remove Cu salts that are still adhering, the silica gel grafted with poly(styrene-block-p-tert.-butylstyrene) is suspended in toluene, a bottom layer (sic) of water is introduced and the aqueous phase is replaced until the aqueous phase no longer has a discernible blue colour. The poly(styrene-block-p-tert.-butylstyrene)-silica gel is then separated off from the organic phase and extracted with toluene for 12 h in a Soxhlet extractor.

Yield: 1.1 g of silica gel grafted with poly(styrene-block-p-tert.-butylstyrene)

Analyses: FT-IR, DSC

Figure 28:
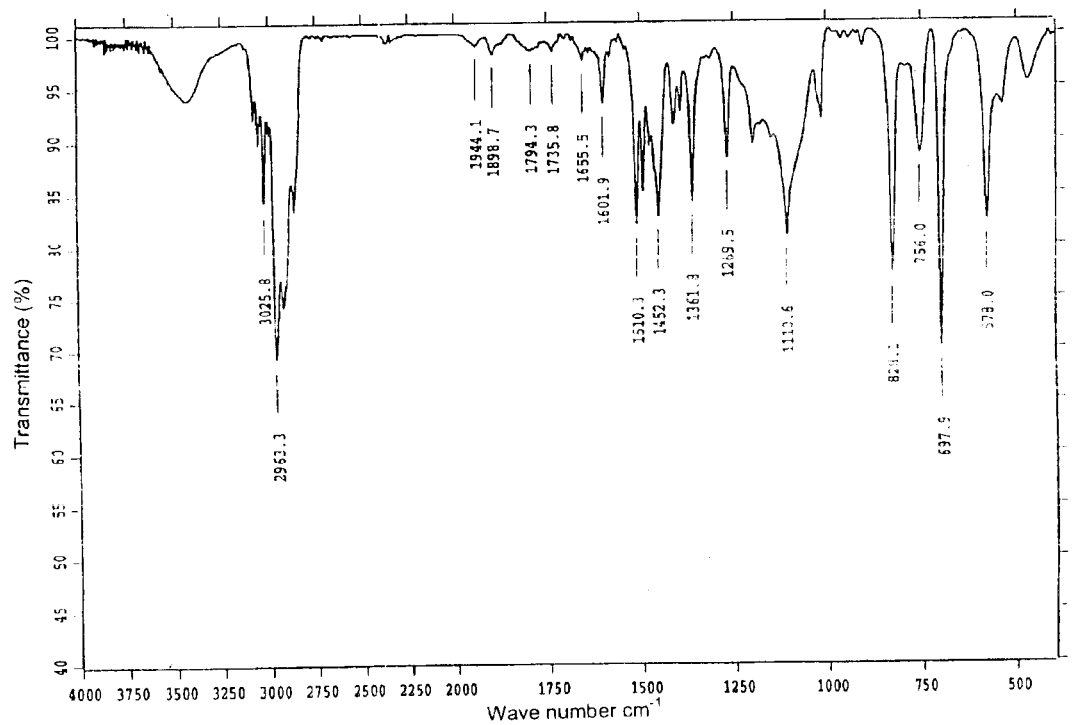
FIG. 28 shows the FT-IR-spectrum of the poly(styrene-block-p-tert.-butylstyrene) grafted to the silica gel.

FIG. 28 shows the FT-IR-spectrum of the poly(styrene-block-p-tert.-butylstyrene) bound to the silica gel surface.

Recording technique: transmission spectrum of a cast film.

Figure 29:
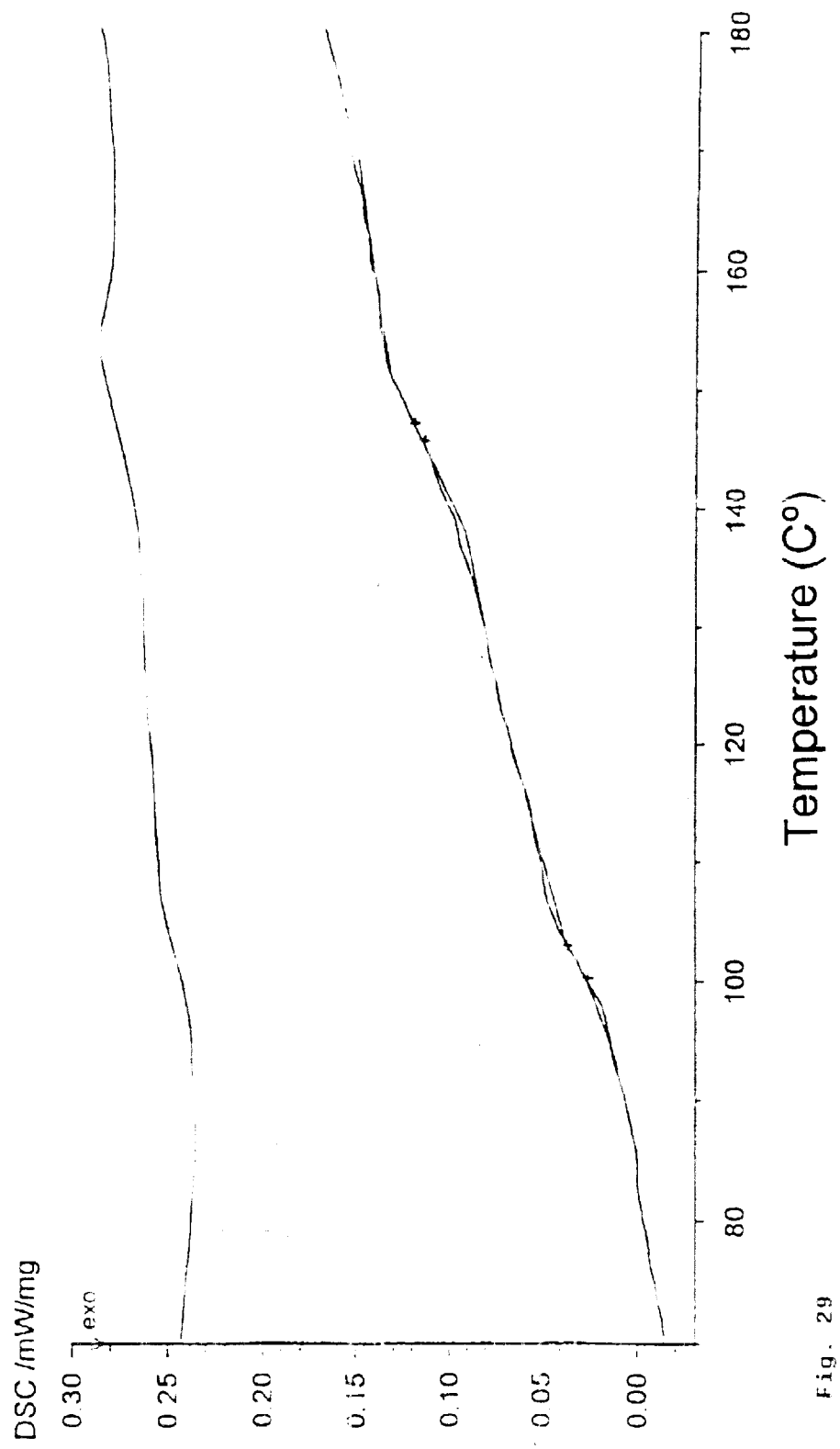
FIG. 29 shows the DSC-curve of the poly(styrene-block-p-tert.-butylstyrene) formed on the silica gel.

FIG. 29 shows the DSC plots of the poly(styrene-block-p-tert.-butylstyrene) formed on the silica gel surface.

The upper plot and the lower plot are the heating curves obtained sequentially, programmed cooling having been carried out following the first heating. In the lower plot two glass transition steps of the block copolymer in the range between 100° C. and 105° C. and in the range between 137° C. and 145° C. can clearly be seen. The first transition is assigned to the poly(styrene) block and the second transition to the poly(p-tert.-butylstyrene) block.

Polymer-analogous Reaction at Solids Grafted with Polymer

28. Example

Partial Ester Cleavage to Microgel Grafted with Poly-(acrylic acid-co-tert.-butylacrylic acid)

Trifluoroacetic acid is used without further purification. The pretreatment of dichloromethane has been described in Example 4 above.

500 mg of the micro-gel grafted with poly(tert.-butyl acrylate) from Example 20 are suspended in 20 ml dichloromethane. 0.5 ml (6.5 mmol) trifluoroacetic acid are added to this suspension. The reaction mixture is stirred at room temperature for 24 h with exclusion of moisture.

The grafted microgel is separated off via a glass frit and washed with ethanol, ethanol/water (1/1 V/V), ethanol and diethyl ether. The product is dried in a vacuum oven at 60° C. and 10 mbar.

Yield: 443 mg of microgel grafted with poly(acrylic acid-co-tert.-butylacrylic acid)

Cleavage of the Polymers from the Solid Surface

29. Example

Cleavage of the Poly(styrene) from the Silica Gel Surface for Analysis of the Poly(styrene)

p-Toluenesulphonic acid monohydrate is used without further purification. Methanol is distilled. The pretreatment of toluene has been described in Example 13 above.

500 mg of the silica gel grafted with poly(styrene) from Example 21 are suspended in 150 ml toluene. 100 mg p-toluenesulphonic acid monohydrate and 10 ml methanol are added to this suspension and the reaction mixture is heated under reflux for 16 h. The poly(styrene)-solution is then separated off from the silica gel by centrifuging. Three times in all the silica gel is suspended in toluene and centrifuged in order to separate off any poly(styrene) still adhering to the silica gel.

Yield: 250 mg poly(styrene)

Analysis: GPC

Figure 30:
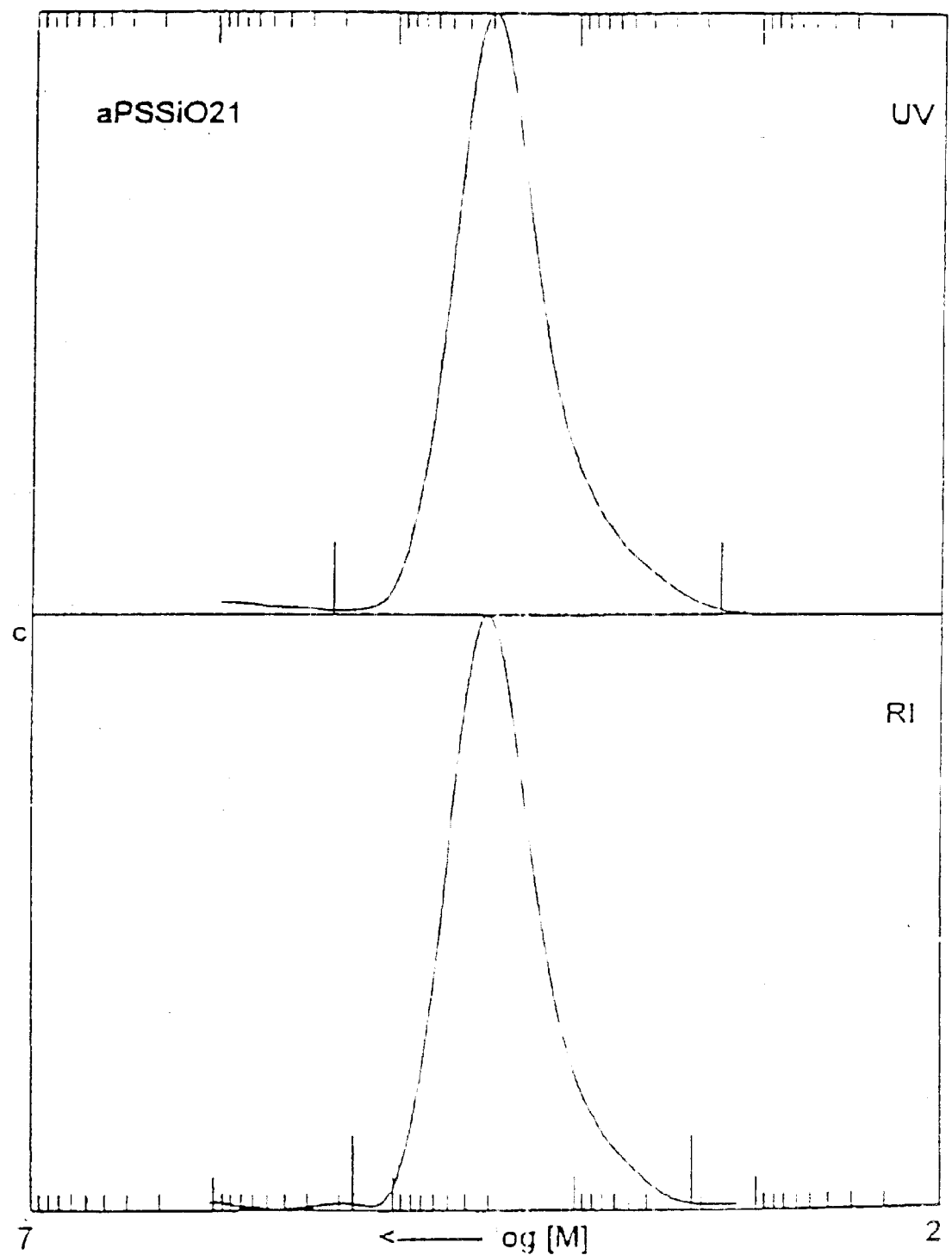
FIG. 30 shows the GPC-chromatogram of the degrafted poly(styrene) of the first generation.

FIG. 30 shows the GPC chromatogram of the cleaved first generation poly(styrene).

Chromatography conditions: eluent: THF, detection: UV and RI, calibration: poly(styrene) standards From UV: Mw=29499, Mn=18349, U=0.61; from RI: Mw=30766, Mn=21085, U=0.46.

30. Example

Cleavage of the Poly(styrene) from the Silica Gel Surface for Analysis of the Poly(styrene)

Silica gel grafted with poly(styrene) from Example 22 is used. The procedure and working up are as described in Example 29.

Yield: 190 mg poly(styrene)

Analysis: GPC

Figure 31:
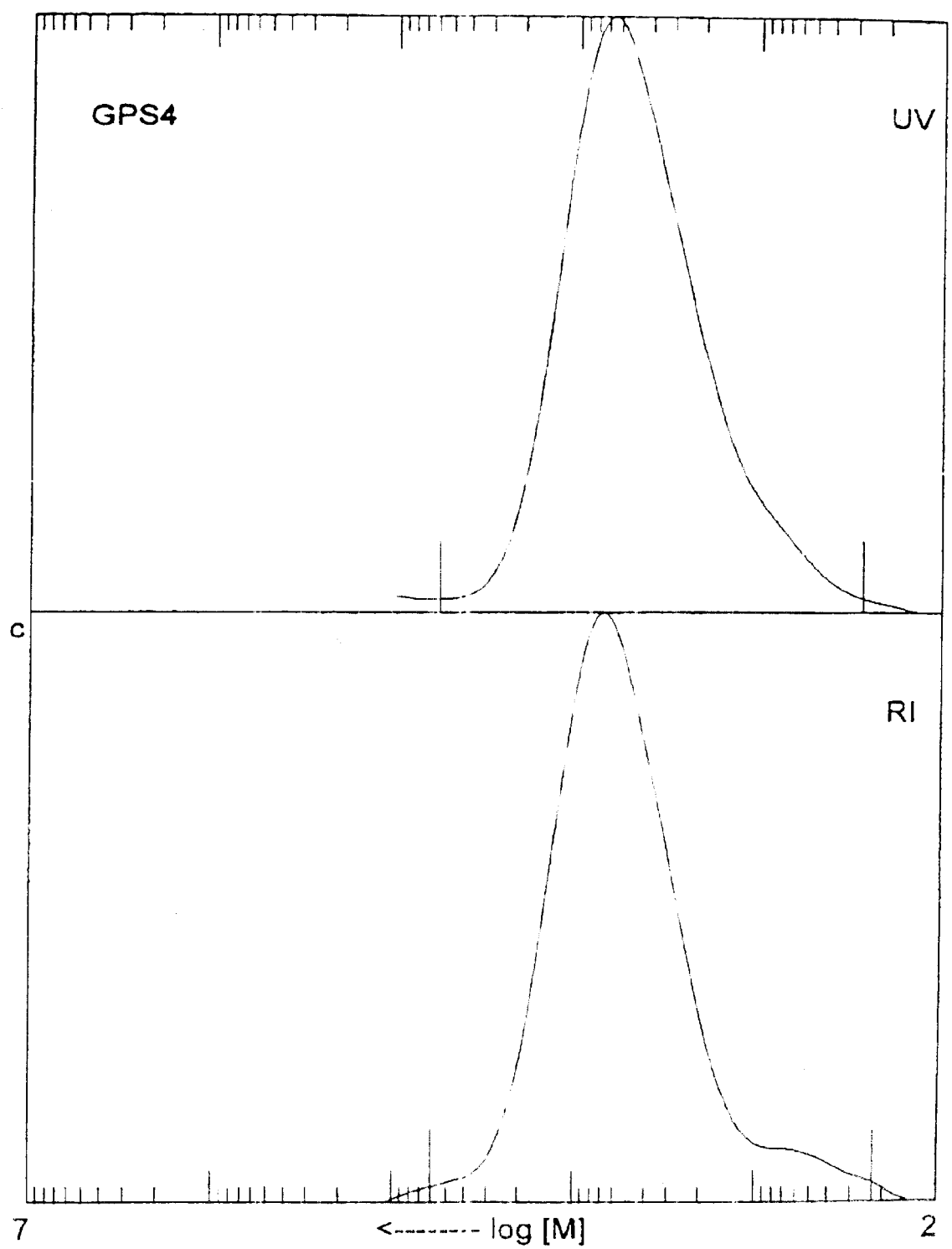
FIG. 31 shows the GPC-chromatogram of the degrafted poly(styrene).

FIG. 31 shows the GPC chromatogram of the cleaved poly(styrene).

Chromatography conditions: eluent: THF, detection: UV and RI, calibration: poly(styrene) standards From UV: Mw=6748, Mn=3477, U=0.94; from RI: Mw=7624, Mn=3932, U=0.94

31. Example

Cleavage of the Poly(methyl methacrylate) from the Silica Gel Surface 250 mg of silica gel grafted with poly(methyl methacrylate) from Example 24, 75 ml toluene, 5 ml methanol and 50 mg p-toluenesulphonic acid monohydrate are used. The procedure and working up are analogous to those described in Example 29. The silica gel is washed with THF instead of toluene.

Yield: 200 mg poly(methyl methacrylate)

Analysis: GPC

Figure 32:
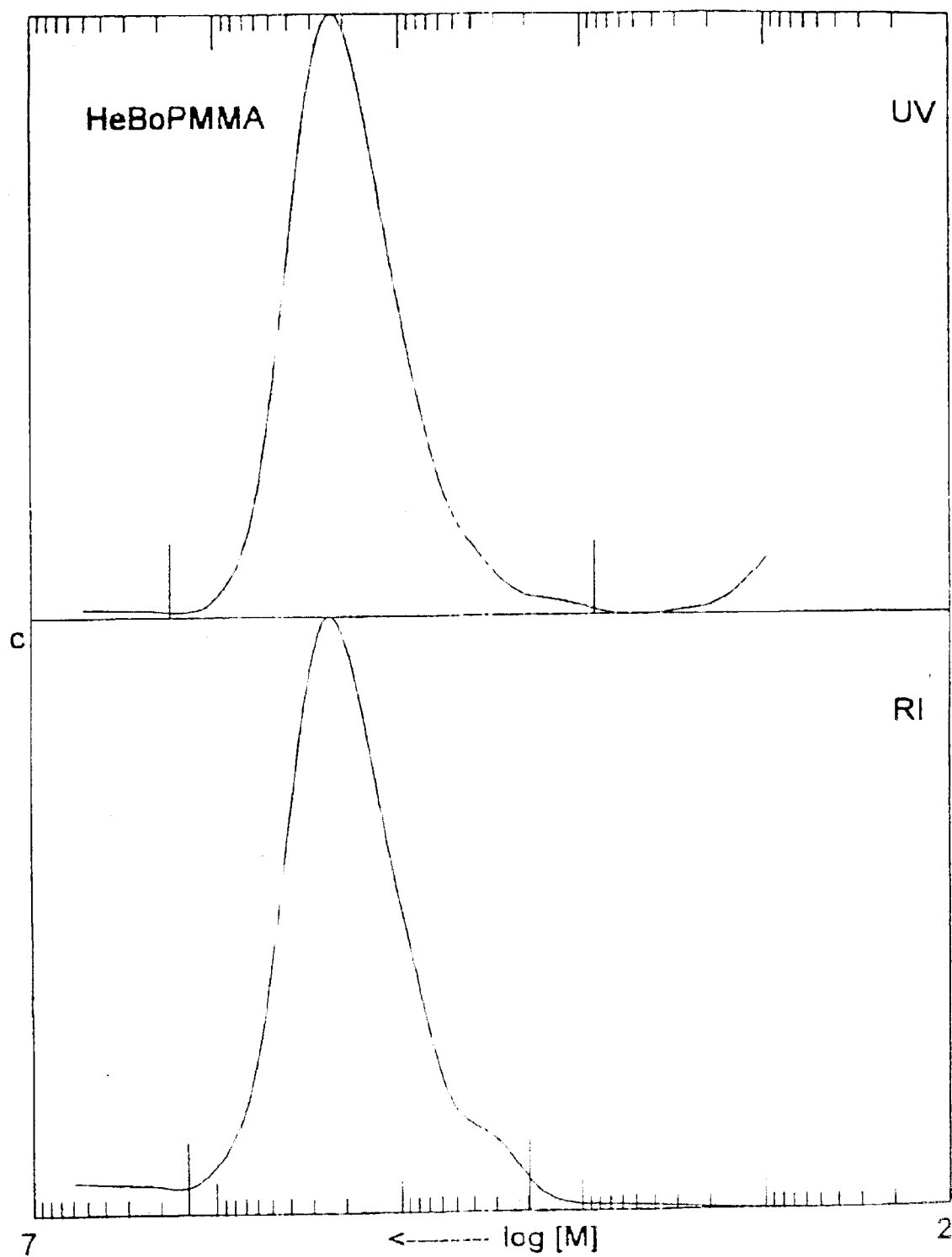
FIG. 32 shows the GPC-chromatogram of the cleaved poly(methylmethacrylate.

FIG. 32 shows the GPC chromatogram of the cleaved poly(methyl methacrylate)

Chromatography conditions: eluent: THF, detection: UV and RI, calibration: poly(styrene) standards From UV: Mw=230031, Mn=137187, U=0.68; from RI: Mw=240377, Mn=146811, U=0.64

32. Example

Cleavage of the Poly(styrene) Formed in the First and Second Generation from the Silica Gel Surface Silica gel grafted with poly(styrene) from Example 26 is used. The procedure and working up are as described in Example 29.

Yield: 390 mg poly(styrene)

Analysis: GPC

Figure 33:
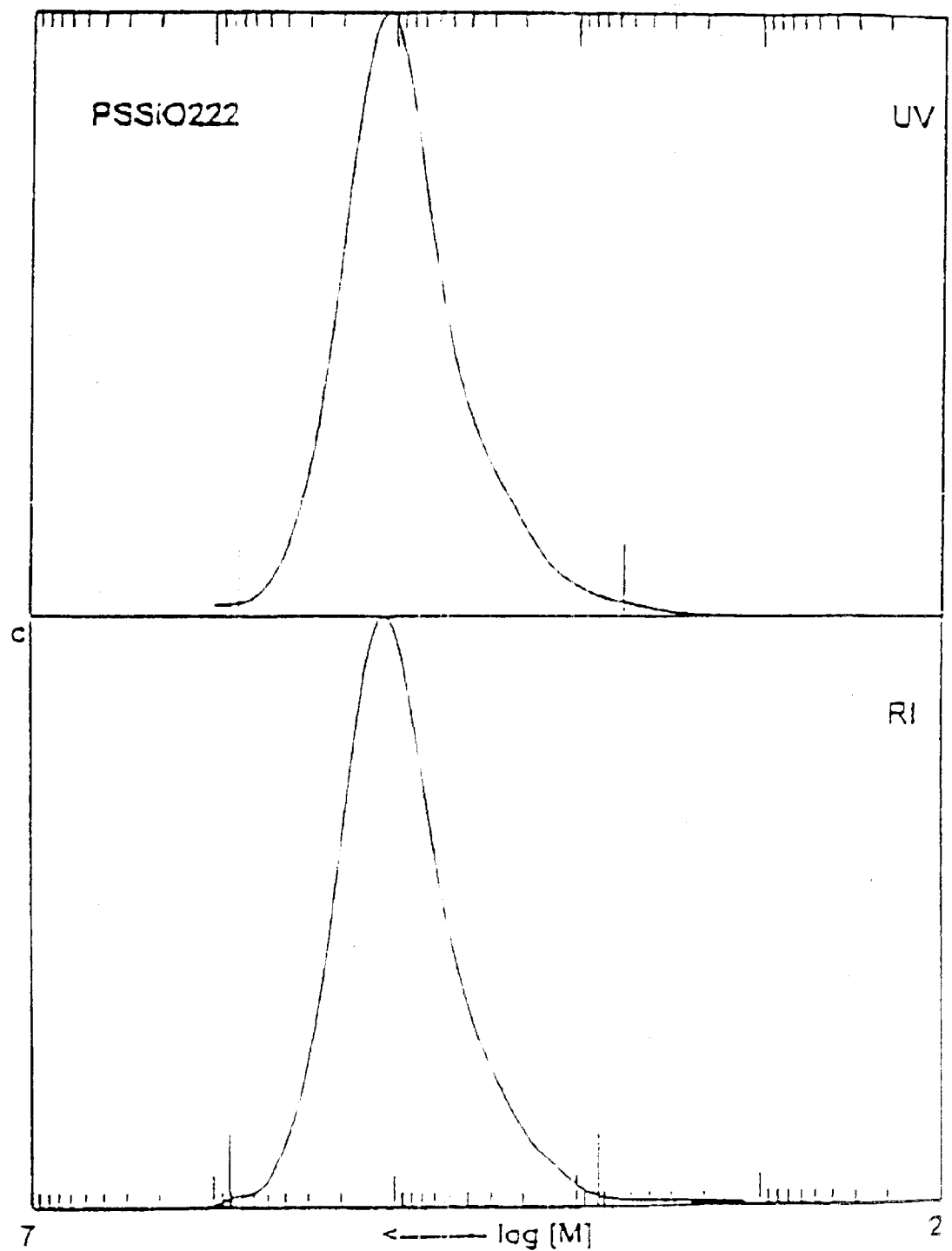
FIG. 33 shows the GPC-chromatogram of the cleaved poly(styrene) of first and second generation.

FIG. 33 shows the GPC chromatogram of the cleaved first and second generation poly(styrene).

Chromatography conditions: eluent: THF, detection: UV and RI, calibration: poly(styrene) standards From UV: Mw=116159, Mn=68097, U=0.71; from RI: Mw=119581, Mn=71587, U=0.66

33. Example

Cleavage of the Poly(styrene-block-p-tert.-butylstyrene) from the Silica Gel Surface Dioxane and methanol are distilled. The pretreatment of toluene has been described in Example 13 above.

250 mg of the polymer-coated silica gel from Example 27 are suspended in a mixture of 25 ml toluene, 40 ml dioxane and 40 ml 5N sodium hydroxide solution and heated under reflux for 48 h.

After separating off the aqueous phase, the organic phase is concentrated under vacuum. The polymer is then precipitated in methanol. The polymer is re-dissolved in toluene and the solution is centrifuged in order to separate off any silica gel particles present. The supernatant solution is carefully removed and concentrated under vacuum and the polymer is then precipitated in methanol. The polymer is separated off and dried at 60° C. under vacuum (10 mbar).

Yield: 180 mg poly(styrene-block-p-tert.-butylstyrene)

Analysis: GPC

Figure 34:
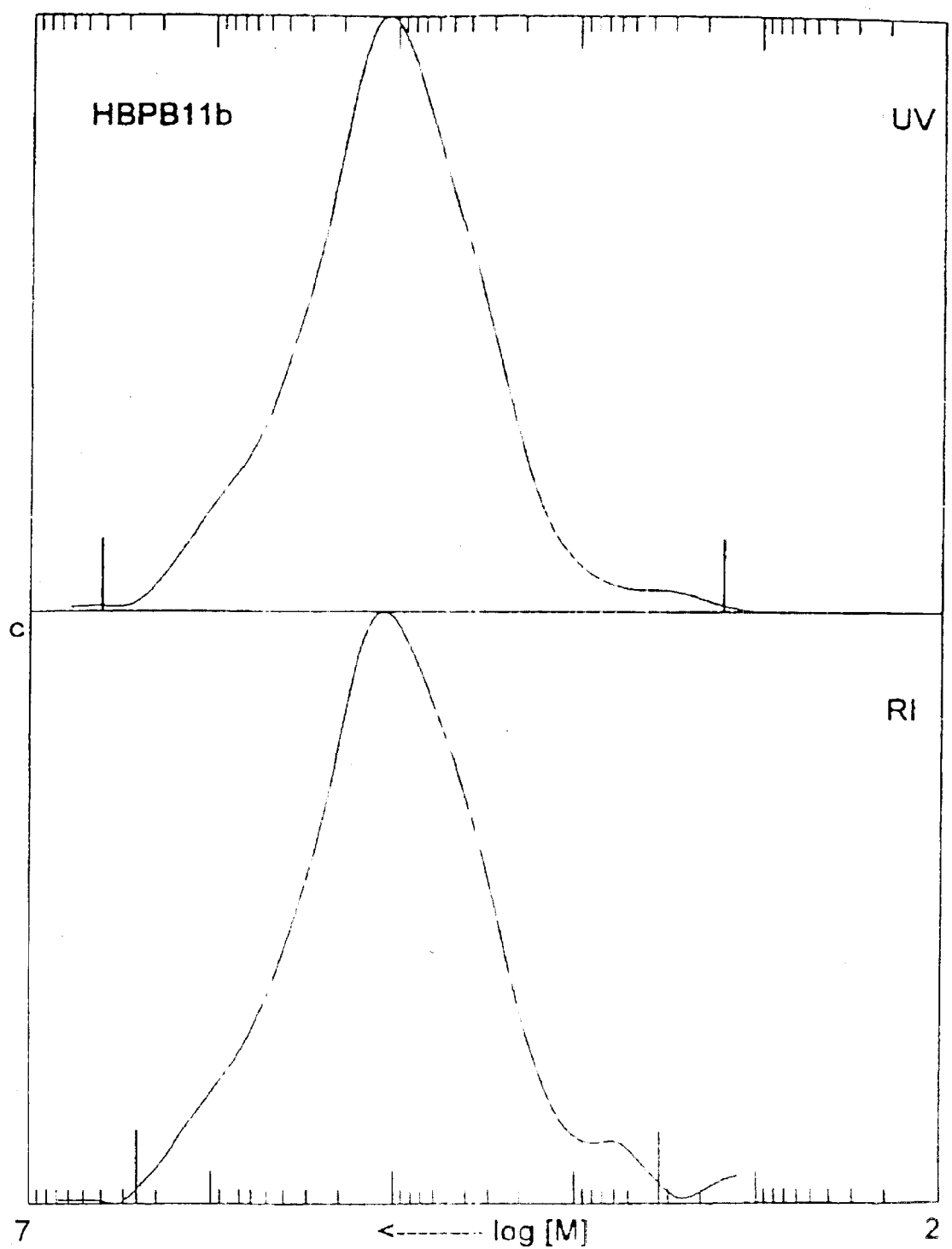
FIG. 34 shows the GPC-chromatogram of the cleaved poly(styrene-block-p-tert.-butylstyrene).

FIG. 34 shows the GPC chromatogram of the cleaved poly(styrene-block-p-tert.-butylstyrene)

Chromatography conditions: eluent: THF, detection: UV and RI, calibration: poly(styrene) standards From UV: Mw=203767, Mn=55552, U=2.67; from RI: Mw=196492, Mn=54679, U=2.59.

What is claimed is:

1. A solid substrate surface having chemically bonded thereto a compound of general formula (1) as initiator for an ATRP-polymerization $$A\text{-}L\text{-}I \tag{1}$$

wherein

A is an anchor group bonding the compound to the solid substrate surface

I is a group for initiating a reaction which proceeds according to an ATRP-mechanism, and L is a link between the groups A and I.

2. Solid substrate surface with a polymer and/or oligomer layer, produced by a process comprising the following steps:
 a) providing and optionally preparing a solid substrate surface,
 b) chemically bonding to the solid substrate surface an initiator which includes a group I for initiation of a reaction which proceeds according to an ATRP-mechanism,
 c) subsequent to step b), carrying out on the solid substrate surface a first ATRP-polymerization initiated by the initiator, with radically polymerizable (a) monomers, (b) macromonomers, or (c) mixtures thereof, so that a first layer of polymers and/or oligomers is formed on the solid substrate surface.

* * * * *